US012615104B2

(12) United States Patent
Nie

(10) Patent No.: US 12,615,104 B2
(45) Date of Patent: Apr. 28, 2026

(54) ADAPTER FOR AN AUTOMATION FIELD DEVICE DESIGNED FOR LINKING TO HIGHWAY ADDRESSABLE REMOTE TRANSDUCER (HART) OR 4-20 mA COMMUNICATIONS LOOP CONNECTED TO FIELD DEVICE

(71) Applicant: Huawei Technologies Co., Ltd., Shenzhen (CN)

(72) Inventor: Er Nie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/760,627

(22) Filed: Jul. 1, 2024

(65) Prior Publication Data

US 2024/0356670 A1      Oct. 24, 2024

Related U.S. Application Data

(63) Continuation of application No. PCT/CN2022/143025, filed on Dec. 28, 2022.

(30) Foreign Application Priority Data

Dec. 31, 2021      (CN) .......................... 202111679102.7

(51) Int. Cl.
H04L 1/00                (2006.01)

(52) U.S. Cl.
CPC ...... H04L 1/004 (2013.01); G06F 2213/0008 (2013.01)

(58) Field of Classification Search
CPC ............................................... G06F 2213/0008
See application file for complete search history.

(56) References Cited

U.S. PATENT DOCUMENTS

| | | | | |
|---|---|---|---|---|
| 10,216,421 | B2 * | 2/2019 | Lee .......................... | G06F 3/061 |
| 10,942,886 | B2 * | 3/2021 | Kobayashi .............. | G06F 13/42 |
| 2009/0125735 | A1 * | 5/2009 | Zimmerman ........... | G06F 1/325 370/503 |
| 2016/0241462 | A1 | 8/2016 | Wang et al. | |
| 2017/0177219 | A1 | 6/2017 | Lee et al. | |
| 2017/0222686 | A1 * | 8/2017 | Khan .................... | H04L 69/324 |

(Continued)

FOREIGN PATENT DOCUMENTS

| | | |
|---|---|---|
| CN | 108134650 A | 6/2018 |
| CN | 109947681 A | 6/2019 |
| EP | 3412016 B1 | 12/2018 |

(Continued)

*Primary Examiner* — Tammara R Peyton
(74) *Attorney, Agent, or Firm* — Conley Rose, P.C.

(57) ABSTRACT

A high-speed serial interface includes a physical layer circuit at a transmit end, a monitor, a clock gating circuit, a control bitstream generation circuit, and a random bitstream generation circuit. The monitor is configured to: when no service data is being sent, instruct the clock gating circuit to stop sending a clock signal to partial modules in the physical layer circuit at the transmit end. The control bitstream generation circuit sends a first control bitstream through a serializer/deserializer (SerDes), to indicate that the transmit end has turned off partial modules in the physical layer (PHY) circuit at the transmit end and so on. The random bitstream generation circuit sends a random bitstream.

22 Claims, 9 Drawing Sheets

(56) References Cited

U.S. PATENT DOCUMENTS

| | | |
|---|---|---|
| 2019/0044553 A1 | 2/2019 | Bunce et al. |
| 2020/0257645 A1 | 8/2020 | Kobayashi et al. |

FOREIGN PATENT DOCUMENTS

| | | |
|---|---|---|
| JP | 2011504005 A | 1/2011 |
| JP | 2012169981 A | 9/2012 |
| WO | 2013001631 A1 | 1/2013 |
| WO | 2013095422 A1 | 6/2013 |
| WO | 2020158589 A1 | 8/2020 |

* cited by examiner

High-speed serial interface at a transmit end

High-speed serial interface at a transmit end
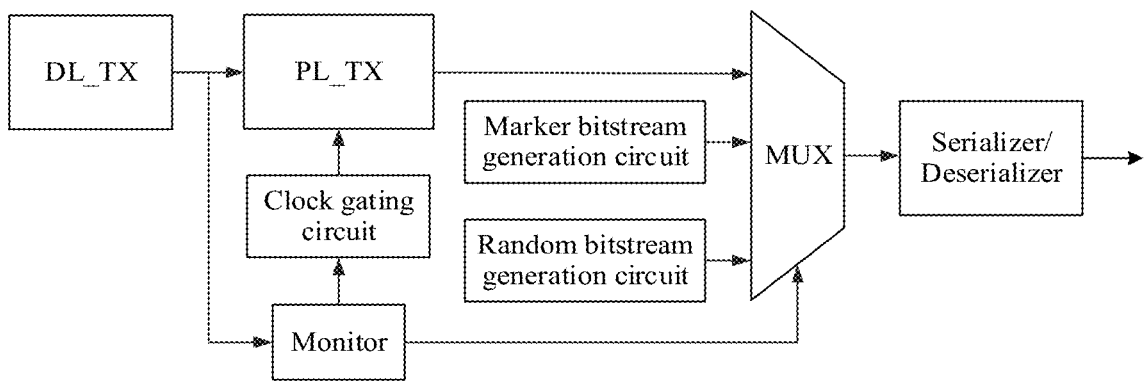
FIG. 3B
High-speed serial interface at a receive end
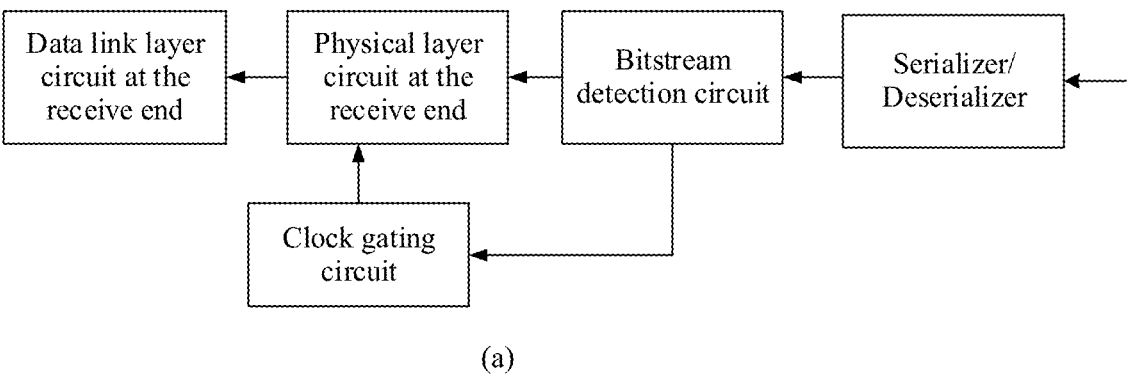
(a)
High-speed serial interface at a receive end
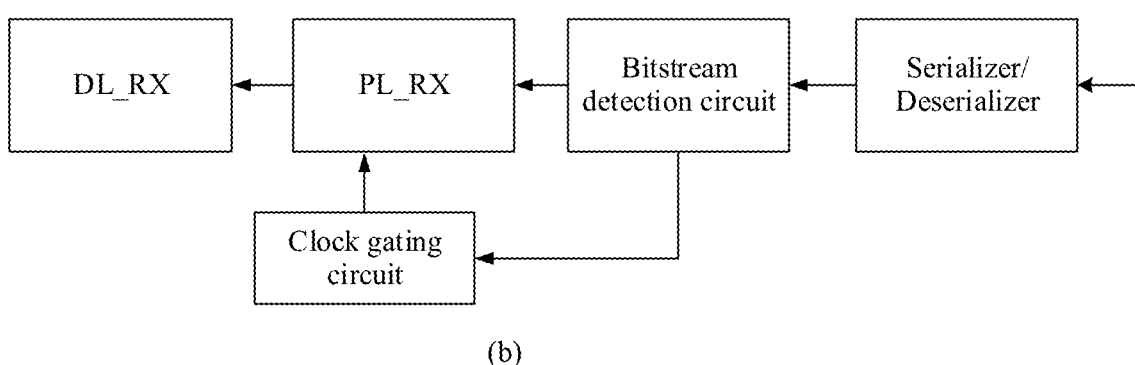
(b)
FIG. 4

High-speed serial interface system at a transmit end

High-speed serial interface system at a receive end

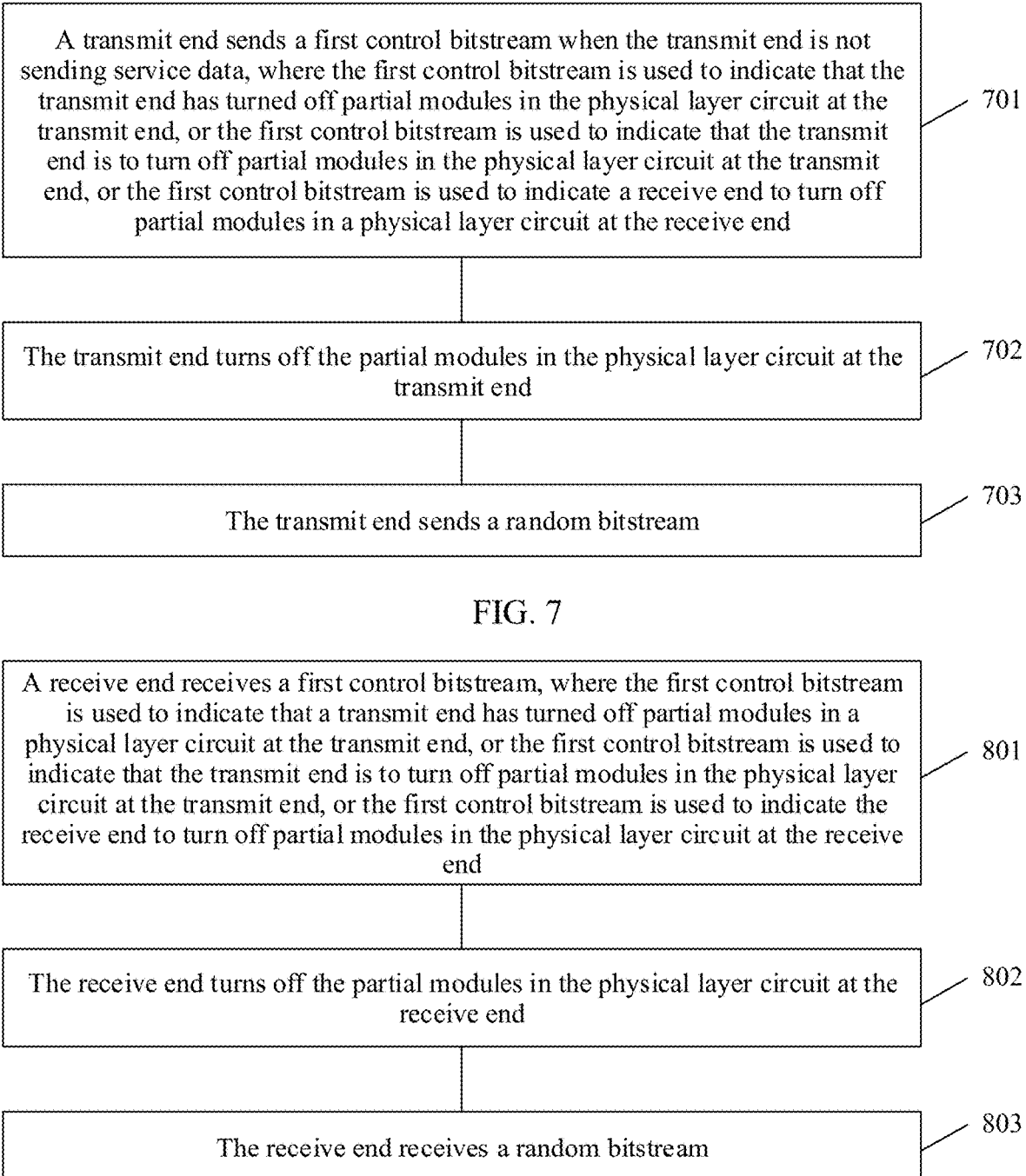

A transmit end sends a first control bitstream when the transmit end is not sending service data, where the first control bitstream is used to indicate that the transmit end has turned off partial modules in the physical layer circuit at the transmit end, or the first control bitstream is used to indicate that the transmit end is to turn off partial modules in the physical layer circuit at the transmit end, or the first control bitstream is used to indicate a receive end to turn off partial modules in a physical layer circuit at the receive end — 701

The transmit end turns off the partial modules in the physical layer circuit at the transmit end — 702

The transmit end sends a random bitstream — 703

FIG. 7

A receive end receives a first control bitstream, where the first control bitstream is used to indicate that a transmit end has turned off partial modules in a physical layer circuit at the transmit end, or the first control bitstream is used to indicate that the transmit end is to turn off partial modules in the physical layer circuit at the transmit end, or the first control bitstream is used to indicate the receive end to turn off partial modules in the physical layer circuit at the receive end — 801

The receive end turns off the partial modules in the physical layer circuit at the receive end — 802

The receive end receives a random bitstream — 803

FIG. 8

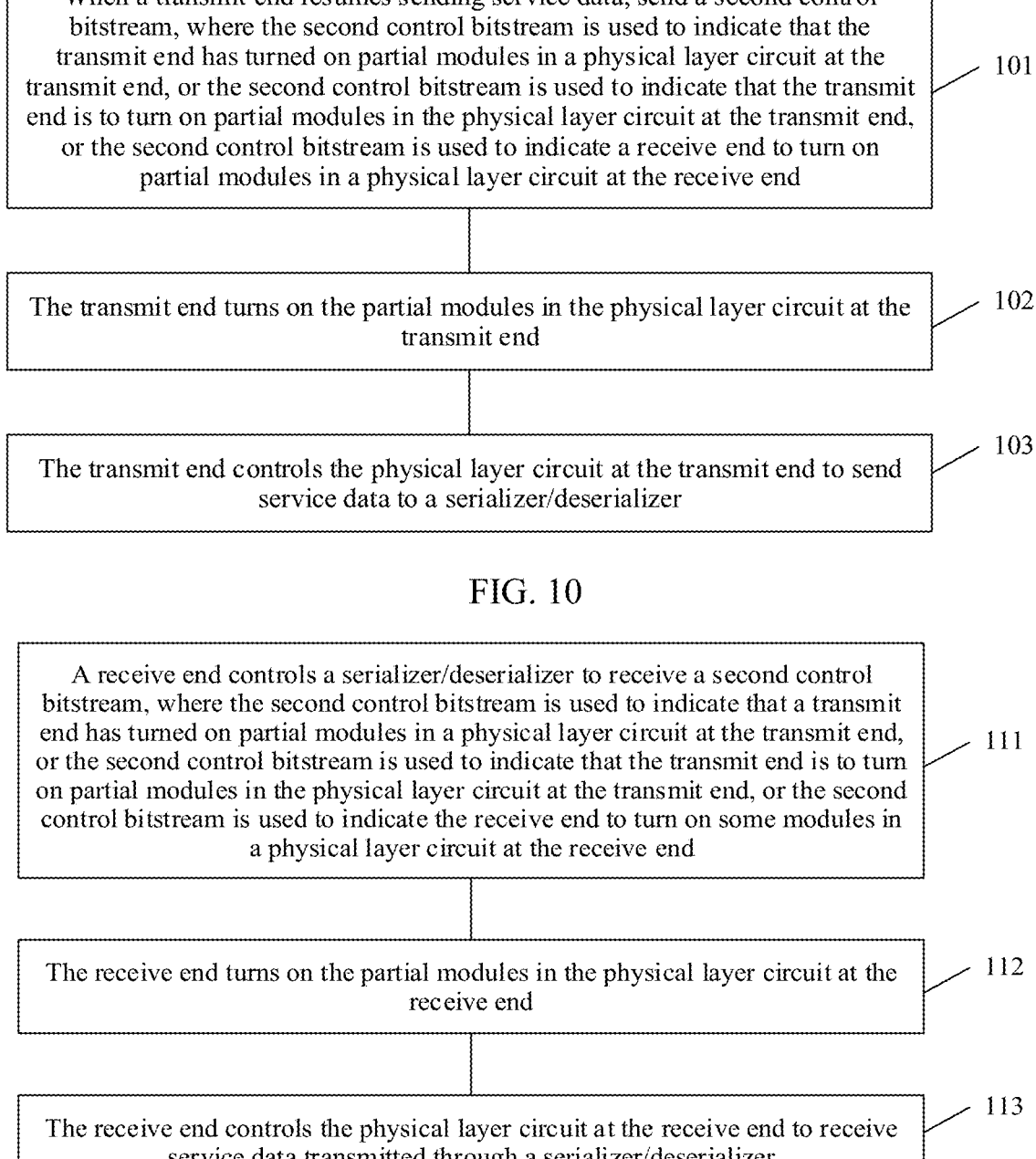

When a transmit end resumes sending service data, send a second control bitstream, where the second control bitstream is used to indicate that the transmit end has turned on partial modules in a physical layer circuit at the transmit end, or the second control bitstream is used to indicate that the transmit end is to turn on partial modules in the physical layer circuit at the transmit end, or the second control bitstream is used to indicate a receive end to turn on partial modules in a physical layer circuit at the receive end ⟋ 101

The transmit end turns on the partial modules in the physical layer circuit at the transmit end ⟋ 102

The transmit end controls the physical layer circuit at the transmit end to send service data to a serializer/deserializer ⟋ 103

FIG. 10

A receive end controls a serializer/deserializer to receive a second control bitstream, where the second control bitstream is used to indicate that a transmit end has turned on partial modules in a physical layer circuit at the transmit end, or the second control bitstream is used to indicate that the transmit end is to turn on partial modules in the physical layer circuit at the transmit end, or the second control bitstream is used to indicate the receive end to turn on some modules in a physical layer circuit at the receive end ⟋ 111

The receive end turns on the partial modules in the physical layer circuit at the receive end ⟋ 112

The receive end controls the physical layer circuit at the receive end to receive service data transmitted through a serializer/deserializer ⟋ 113

FIG. 11

ADAPTER FOR AN AUTOMATION FIELD DEVICE DESIGNED FOR LINKING TO HIGHWAY ADDRESSABLE REMOTE TRANSDUCER (HART) OR 4-20 mA COMMUNICATIONS LOOP CONNECTED TO FIELD DEVICE

CROSS-REFERENCE TO RELATED APPLICATIONS

This is a continuation of International Patent Application No. PCT/CN2022/143025 filed on Dec. 28, 2022, which claims priority to Chinese Patent Application Chinese Patent Application No. 202111679102.7 filed on Dec. 31, 2021. The disclosures of the aforementioned applications are hereby incorporated by reference in their entireties.

TECHNICAL FIELD

Embodiments of this disclosure relate to the field of chip technologies, and in particular, to a high-speed serial interface and a data transmission method.

BACKGROUND

After a rate of a high-speed serial interface is increased to 64 gigatransfers per second (GT/s) or higher, a bit error rate is high. A forward error correction (FEC) technology needs to be used at a transmit end to encode to-be-sent data. In addition, at a receive end, FEC decoding and error correction need to be performed on data output by a receiver (RX) circuit of a serializer/deserializer (SerDes). In addition, to ensure that a quantity of 0s and a quantity of 1s in data sent by the transmit end to the SerDes are balanced, a scrambler needs to be used to scramble data obtained through FEC encoding, to ensure that 0s and 1s in the data are balanced.

In another physical layer (PHY) device, for example, Peripheral Component Interconnect Express (PCIe), when no service packet is sent on a link within a short period of time, a transmit end needs to insert an invalid (Idle) bitstream in a sending direction for data padding, to ensure that a SerDes at the transmit end can continuously send data. However, in this case, when the transmit end sends an idle bitstream, high power consumption occurs at the transmit end and a receive end, and power consumption of the device is high.

SUMMARY

Embodiments of this disclosure provide a high-speed serial interface and a data transmission method, to reduce power consumption of a PHY circuit of a high-speed serial interface when no service data is being sent.

To achieve the foregoing objective, the following technical solutions are used in embodiments of this disclosure.

According to a first aspect, a high-speed serial interface is provided. The high-speed serial interface includes a PHY circuit at a transmit end, a monitor, a clock gating circuit (CLK_GAT), a control bitstream generation circuit, a random bitstream generation circuit, and a SerDes. The monitor is configured to: when the transmit end is not sending service data, indicate the CLK_GAT to stop sending a clock signal to partial modules in the PHY circuit at the transmit end. The CLK_GAT is configured to stop sending the clock signal to the partial modules in the PHY circuit at the transmit end. The control bitstream generation circuit is configured to: when it is determined that the CLK_GAT has stopped sending the clock signal, send a first control bitstream through the SerDes, where the first control bitstream is used to indicate that the transmit end has turned off the partial modules in the PHY circuit at the transmit end, or the first control bitstream is used to indicate that the transmit end is to turn off the partial modules in the PHY circuit at the transmit end, or the first control bitstream is used to indicate a receive end to turn off partial modules in a PHY circuit at the receive end. The random bitstream generation circuit is configured to send a random bitstream to the SerDes.

Therefore, if no service data currently needs to be sent, the high-speed serial interface may stop send the clock signal to the partial modules in the PHY circuit at the transmit end, so that the partial modules in the PHY circuit at the transmit end are in a non-driven state. This can reduce power consumption of the PHY circuit at the transmit end. In addition, the control bitstream generation circuit may further send the first control bitstream to indicate that the PHY circuit needs to be turned off. In this way, the first control bitstream is equivalent to an on/off indication, indicating that the receive end may also turn off the partial modules in the PHY circuit at the receive end without receiving service data. To enable a clock and data recovery (CDR) circuit of the SerDes to remain in a locked state to avoid errors, the random bitstream is further sent after the first control bitstream is sent. Neither the first control bitstream nor the random bitstream passes through the partial modules in the PHY circuit at the transmit end or the partial modules in the PHY circuit at the receive end. In this way, both the PHY circuit at the transmit end and the PHY circuit at the receive end can perform a function of reducing power consumption.

In a possible design, the partial modules in the PHY circuit at the transmit end include at least one of an FEC encoding circuit or a scrambling circuit, and the partial modules in the PHY circuit at the receive end include at least one of an FEC decoding circuit or a descrambling circuit. In the PHY circuit at the transmit end, the FEC circuit and the scrambling/descrambling circuit are power-consuming. Therefore, when no service data is currently transmitted, the FEC circuit and the scrambling/descrambling circuit may be turned off to reduce power consumption. Certainly, in this disclosure, the partial modules in the PHY circuit at the transmit end that need to be turned off are not limited to the FEC encoding circuit and the scrambling circuit, and the partial modules in the PHY circuit at the receive end are not limited to the FEC decoding circuit and the descrambling circuit either. Other power-consuming circuits may be further included. For example, the partial modules in the PHY circuit at the transmit end may further include a data distribution circuit, and the partial modules in the PHY circuit at the receive end may further include a symbol lock circuit, a deskew circuit, and the like.

In a possible design, the high-speed serial interface further includes a data link layer (DL) at the transmit end; and the monitor is configured to: monitor whether the DL at the transmit end is sending service data to the PHY circuit at the transmit end; and when it is determined that the DL at the transmit end is not sending service data to the PHY circuit at the transmit end, determine that the transmit end is not sending service data. To be specific, that the DL at the transmit end is not sending service data is equivalent to that the transmit end is currently not sending service data, and the partial modules in the PHY circuit at the transmit end may be turned off to reduce power consumption.

In a possible design, the monitor is further configured to: when it is determined that the CLK_GAT has stopped sending the clock signal to the partial modules in the PHY circuit at the transmit end, send a first signal to the control bitstream generation circuit, where the first signal is used to indicate the control bitstream generation circuit to send the first control bitstream; and when it is determined that the control bitstream generation circuit has completed sending the first control bitstream, send a second signal to the random bitstream generation circuit, where the second signal is used to indicate the random bitstream generation circuit to send the random bitstream. To be specific, in this disclosure, when determining that no service data is being sent, the monitor may trigger the bitstream generation circuit to send the first control bitstream, and may further trigger the random bitstream generation circuit to send the random bitstream. Neither of the bitstreams passes through the partial modules in the PHY circuit at the transmit end. Certainly, the monitor may alternatively not trigger sending of the two bitstreams, and a control circuit other than the monitor may alternatively monitor a status of each circuit. When determining that no service data is being sent, the control circuit indicates the bitstream generation circuit to send the first control bitstream, and may further indicate the random bitstream generation circuit to send the random bitstream.

In a possible design, the monitor is further configured to: when the transmit end resumes sending service data, indicate the CLK_GAT to send the clock signal to the partial modules in the PHY circuit at the transmit end; the CLK_GAT is further configured to send the clock signal to the partial modules in the PHY circuit at the transmit end; the random bitstream generation circuit is further configured to: when it is determined that the CLK_GAT starts to send the clock signal, stop sending the random bitstream; the control bitstream generation circuit is further configured to: when it is determined that the transmit end resumes sending service data, send a second control bitstream through the SerDes, where the second control bitstream is used to indicate that the transmit end has turned on the partial modules in the PHY circuit at the transmit end, or the second control bitstream is used to indicate that the transmit end is to turn on the partial modules in the PHY circuit at the transmit end, or the second control bitstream is used to indicate the receive end to turn on the partial modules in the PHY circuit at the receive end; and the PHY circuit at the transmit end is configured to start to send service data through the SerDes.

To be specific, when sending of service data is resumed, the monitor may further indicate the random bitstream generation circuit to stop sending the random bitstream, and indicate the control bitstream generation circuit to send the second control bitstream, where the second control bitstream may be used to indicate to turn on the partial modules in the PHY circuit at the receive end, so that the PHY circuit at the receive end can resume sending service data.

In a possible design, the first control bitstream includes a plurality of repeated bitstream identifiers, a first marker end identifier, and first bitstream content, where the first bitstream content indicates that the transmit end has turned off the partial modules in the PHY circuit at the transmit end, or the first control bitstream is used to indicate that the transmit end is to turn off the partial modules in the PHY circuit at the transmit end, or the first control bitstream is used to indicate the receive end to turn off the partial modules in the PHY circuit at the receive end, and the first marker end identifier is used to indicate a position of an end bit of the first control bitstream. The second control bitstream includes a plurality of repeated bitstream identifiers, a second marker end identifier, and second bitstream content, where the second bitstream content indicates that the transmit end has turned on the partial modules in the PHY circuit at the transmit end, or the second control bitstream is used to indicate that the transmit end is to turn on the partial modules in the PHY circuit at the transmit end, or the second control bitstream is used to indicate the receive end to turn on the partial modules in the PHY circuit at the receive end, and the second marker end identifier is used to indicate a position of an end bit of the second control bitstream. The random bitstream is used to enable the CDR circuit of the SerDes to remain in a locked state, and the random bitstream includes 0s and 1s that are balanced in quantities. Implementation of the first control bitstream and the second control bitstream is not limited in this disclosure.

According to a second aspect, a high-speed serial interface is provided. The high-speed serial interface includes a PHY circuit at a receive end, a bitstream detection circuit, a CLK_GAT, and a SerDes. The bitstream detection circuit is configured to receive a first control bitstream through the SerDes, where the first control bitstream is used to indicate that a transmit end has turned off partial modules in a PHY circuit at the transmit end, or the first control bitstream is used to indicate that the transmit end is to turn off partial modules in the PHY circuit at the transmit end, or the first control bitstream is used to indicate the receive end to turn off partial modules in the PHY circuit at the receive end. The bitstream detection circuit is further configured to indicate the CLK_GAT to stop sending a clock signal to the partial modules in the PHY circuit at the receive end. The CLK_GAT is configured to stop sending the clock signal to the partial modules in the PHY circuit at the receive end. The bitstream detection circuit is further configured to receive a random bitstream through the SerDes.

In this way, when receiving the first control bitstream, the receive end knows that the transmit end has no service data to send, and the receive end may turn off the partial modules in the PHY circuit at the receive end to reduce power consumption. In addition, to enable a CDR circuit of the SerDes at the receive end to remain in a locked state, the SerDes at the receive end may continue to receive the random bitstream after receiving the first control bitstream.

In a possible design, the partial modules in the PHY circuit at the transmit end include at least one of an FEC encoding circuit or a scrambling circuit, and the partial modules in the PHY circuit at the receive end include at least one of an FEC decoding circuit or a descrambling circuit. For beneficial effect of this design, refer to the descriptions of the first aspect.

In a possible design, the high-speed serial interface further includes a DL at the receive end; and the CLK_GAT is configured to: when it is determined that an interval from the last time at which the PHY circuit at the receive end sends service data to the DL at the receive end exceeds a preset time period, stop sending the clock signal to the partial modules in the PHY circuit at the receive end. When it is determined that the interval from the last time at which the PHY circuit at the receive end sends service data to the DL at the receive end exceeds the preset time period, it may be determined that no service data is currently to be received and received service data has been completely sent to the DL at the receive end.

In a possible design, the bitstream detection circuit is further configured to: control the SerDes to receive a second control bitstream, and when the second control bitstream is used to indicate that the transmit end has turned on the partial modules in the PHY circuit at the transmit end, or the second control bitstream is used to indicate that the transmit end is to turn on the partial modules in the PHY circuit at the transmit end, or the second control bitstream is used to indicate the receive end to turn on the partial modules in the PHY circuit at the receive end, indicate the CLK_GAT to send the clock signal to the partial modules in the PHY circuit at the receive end. The CLK_GAT is further configured to send the clock signal to the partial modules in the PHY circuit at the receive end. The bitstream detection circuit is further configured to send, to the PHY circuit at the receive end, service data received from the SerDes. For beneficial effect of this design, refer to the descriptions of the first aspect.

In a possible design, the first control bitstream includes a plurality of repeated marker identifiers, a first marker end identifier, and first bitstream content, where the first bitstream content indicates that the transmit end has turned off the partial modules in the PHY circuit at the transmit end, or the first control bitstream is used to indicate that the transmit end is to turn off the partial modules in the PHY circuit at the transmit end, or the first control bitstream is used to indicate the receive end to turn off the partial modules in the PHY circuit at the receive end, and the first marker end identifier is used to indicate a position of an end bit of the first control bitstream. The second control bitstream includes a plurality of repeated marker identifiers, a second marker end identifier, and second bitstream content, where the second bitstream content indicates that the transmit end has turned on the partial modules in the PHY circuit at the transmit end, or the second control bitstream is used to indicate that the transmit end is to turn on the partial modules in the PHY circuit at the transmit end, or the second control bitstream is used to indicate the receive end to turn on the partial modules in the PHY circuit at the receive end, and the second marker end identifier is used to indicate a position of an end bit of the second control bitstream. The random bitstream is used to enable the CDR circuit of the SerDes to remain in a locked state, and the random bitstream includes 0s and 1s that are balanced in quantities. The bitstream detection circuit is further configured to discard the random bitstream when the random bitstream is identified. For beneficial effect of this design, refer to the descriptions of the first aspect.

According to a third aspect, a data transmission method is provided, and is applied to a high-speed serial interface. The high-speed serial interface includes a PHY circuit at a transmit end. The method includes: the transmit end sends a first control bitstream when the transmit end is not sending service data, where the first control bitstream is used to indicate that the transmit end has turned off partial modules in the PHY circuit at the transmit end, or the first control bitstream is used to indicate that the transmit end is to turn off partial modules in the PHY circuit at the transmit end, or the first control bitstream is used to indicate a receive end to turn off partial modules in a PHY circuit at the receive end. The transmit end turns off the partial modules in the PHY circuit at the transmit end. The transmit end sends a random bitstream.

For beneficial effect of the third aspect, refer to the descriptions of the first aspect.

In a possible design, the partial modules in the PHY circuit at the transmit end include at least one of an FEC encoding circuit or a scrambling circuit, and the partial modules in the PHY circuit at the receive end include at least one of an FEC decoding circuit or a descrambling circuit.

In a possible design, the high-speed serial interface further includes partial modules at a DL at the transmit end; and that the transmit end is not sending service data includes: When the DL at the transmit end is not sending service data to the PHY circuit at the transmit end, it is determined that the transmit end is not sending service data.

In a possible design, the high-speed serial interface further includes a SerDes, and the method further includes: when the transmit end resumes sending service data, the transmit end sends a second control bitstream, where the second control bitstream is used to indicate that the transmit end has turned on the partial modules in the PHY circuit at the transmit end, or the second control bitstream is used to indicate that the transmit end is to turn on the partial modules in the PHY circuit at the transmit end, or the second control bitstream is used to indicate the receive end to turn on the partial modules in the PHY circuit at the receive end. The transmit end turns on the partial modules in the PHY circuit at the transmit end. The transmit end controls the PHY circuit at the transmit end to send service data to the SerDes.

In a possible design, the first control bitstream includes a plurality of repeated bitstream identifiers, a first marker end identifier, and first bitstream content, where the first bitstream content indicates that the transmit end has turned off the partial modules in the PHY circuit at the transmit end, or the first control bitstream is used to indicate that the transmit end is to turn off the partial modules in the PHY circuit at the transmit end, or the first control bitstream is used to indicate the receive end to turn off the partial modules in the PHY circuit at the receive end, and the first marker end identifier is used to indicate a position of an end bit of the first control bitstream. The second control bitstream includes a plurality of repeated bitstream identifiers, a second marker end identifier, and second bitstream content, where the second bitstream content indicates that the transmit end has turned on the partial modules in the PHY circuit at the transmit end, or the second control bitstream is used to indicate that the transmit end is to turn on the partial modules in the PHY circuit at the transmit end, or the second control bitstream is used to indicate the receive end to turn on the partial modules in the PHY circuit at the receive end, and the second marker end identifier is used to indicate a position of an end bit of the second control bitstream. The random bitstream is used to enable a CDR circuit of the SerDes to be in a locked state, and the random bitstream includes 0s and 1s that are balanced in quantities.

According to a fourth aspect, a data transmission method is provided, and is applied to a high-speed serial interface. The high-speed serial interface includes a PHY circuit at a receive end. The method includes: the receive end receives a first control bitstream, where the first control bitstream is used to indicate that a transmit end has turned off partial modules in a PHY circuit at the transmit end, or the first control bitstream is used to indicate that the transmit end is to turn off partial modules in the PHY circuit at the transmit end, or the first control bitstream is used to indicate the receive end to turn off partial modules in the PHY circuit at the receive end. The receive end turns off the partial modules in the PHY circuit at the receive end. The receive end receives a random bitstream.

For beneficial effect of the fourth aspect, refer to the descriptions of the second aspect.

In a possible design, some modules in the PHY circuit at the receive end include at least one of an FEC encoding circuit or a scrambling circuit, and the partial modules in the PHY circuit at the receive end include at least one of an FEC decoding circuit or a descrambling circuit.

In a possible design, the high-speed serial interface further includes a SerDes, and the method further includes: the receive end controls the SerDes to receive a second control bitstream, where the second control bitstream is used to indicate that the transmit end has turned on the partial modules in the PHY circuit at the transmit end, or the second control bitstream is used to indicate that the transmit end is to turn on the partial modules in the PHY circuit at the transmit end, or the second control bitstream is used to indicate the receive end to turn on the partial modules in the PHY circuit at the receive end. The receive end turns on the partial modules in the PHY circuit at the receive end. The receive end controls the PHY circuit at the receive end to receive service data transmitted through the SerDes.

In a possible design, the first control bitstream includes a plurality of repeated marker identifiers, a first marker end identifier, and first bitstream content, where the first bitstream content indicates that the transmit end has turned off the partial modules in the PHY circuit at the transmit end, or the first control bitstream is used to indicate that the transmit end is to turn off the partial modules in the PHY circuit at the transmit end, or the first control bitstream is used to indicate the receive end to turn off the partial modules in the PHY circuit at the receive end, and the first marker end identifier is used to indicate a position of an end bit of the first control bitstream. The second control bitstream includes a plurality of repeated marker identifiers, a second marker end identifier, and second bitstream content, where the second bitstream content indicates that the transmit end has turned on the partial modules in the PHY circuit at the transmit end, or the second control bitstream is used to indicate that the transmit end is to turn on the partial modules in the PHY circuit at the transmit end, or the second control bitstream is used to indicate the receive end to turn on the partial modules in the PHY circuit at the receive end, and the second marker end identifier is used to indicate a position of an end bit of the second control bitstream. The random bitstream is used to enable the CDR circuit of the SerDes to remain in a locked state, and the random bitstream includes 0s and 1s that are balanced in quantities. The method further includes: discarding the random bitstream when the random bitstream is identified.

According to a fifth aspect, a communication apparatus is provided, and includes at least one processor. The at least one processor is connected to a memory, and the at least one processor is configured to read and execute a program stored in the memory, so that the apparatus performs the method corresponding to any one of the third aspect or the possible designs of the third aspect, or performs the method according to any one of the fourth aspect or the possible designs of the fourth aspect.

According to a sixth aspect, a chip is provided. The chip is coupled to a memory, and is configured to read and execute program instructions stored in the memory, to implement the method corresponding to any one of the third aspect or the possible designs of the third aspect, or perform the method according to any one of the fourth aspect or the possible designs of the fourth aspect.

According to a seventh aspect, this disclosure provides a chip system, and the chip system is used in a cloud center. The chip system includes one or more interface circuits and one or more processors. The interface circuit and the processor are interconnected through a line. The interface circuit is configured to receive a signal from a memory of the cloud center, and send the signal to the processor. The signal includes computer instructions stored in the memory. When the processor executes the computer instructions, the cloud center performs the data transmission method provided in the first aspect or a corresponding possible design of the first aspect.

According to an eighth aspect, embodiments of this disclosure provide a serial interface circuit. The circuit is included in an electronic device, and the apparatus has a function of implementing behavior of an electronic device in any one of the foregoing aspects or the possible implementations of the foregoing aspects. The function may be implemented by hardware, or may be implemented by hardware executing corresponding software.

According to a ninth aspect, a computer-readable storage medium is provided, and includes computer instructions. When the computer instructions run on an electronic device, the electronic device is enabled to perform the method according to any one of the third aspect or the possible designs of the third aspect.

According to a tenth aspect, a computer-readable storage medium is provided, and includes computer instructions. When the computer instructions run on an electronic device, the electronic device is enabled to perform the method according to any one of the third aspect or the possible designs of the third aspect.

It can be understood that a corresponding method provided above may be applied to any one of the high-speed serial interface, the communication apparatus, the chip system, the computer-readable storage medium, the computer program product, or the like provided above. Therefore, for beneficial effect that can be achieved by the high-speed serial interface, the communication apparatus, the chip system, the computer-readable storage medium, or the computer program product, refer to beneficial effect of the corresponding method. Details are not described herein again.

These aspects or other aspects of this disclosure are clearer and easier to understand in the following descriptions.

BRIEF DESCRIPTION OF DRAWINGS

FIG. 3B is a schematic of a circuit of a high-speed serial interface at a transmit end according to an embodiment of this disclosure.

FIG. 4 is a schematic of a circuit of a high-speed serial interface at a receive end according to an embodiment of this disclosure.

FIG. 7 is a schematic flowchart of a data transmission method applied to a transmit end according to an embodiment of this disclosure.

FIG. 8 is a schematic flowchart of a data transmission method applied to a receive end according to an embodiment of this disclosure.

FIG. 10 is a schematic flowchart of a data transmission method applied to a transmit end according to an embodiment of this disclosure.

FIG. 11 is a schematic flowchart of a data transmission method applied to a receive end according to an embodiment of this disclosure.

DESCRIPTION OF EMBODIMENTS

Figure 1:
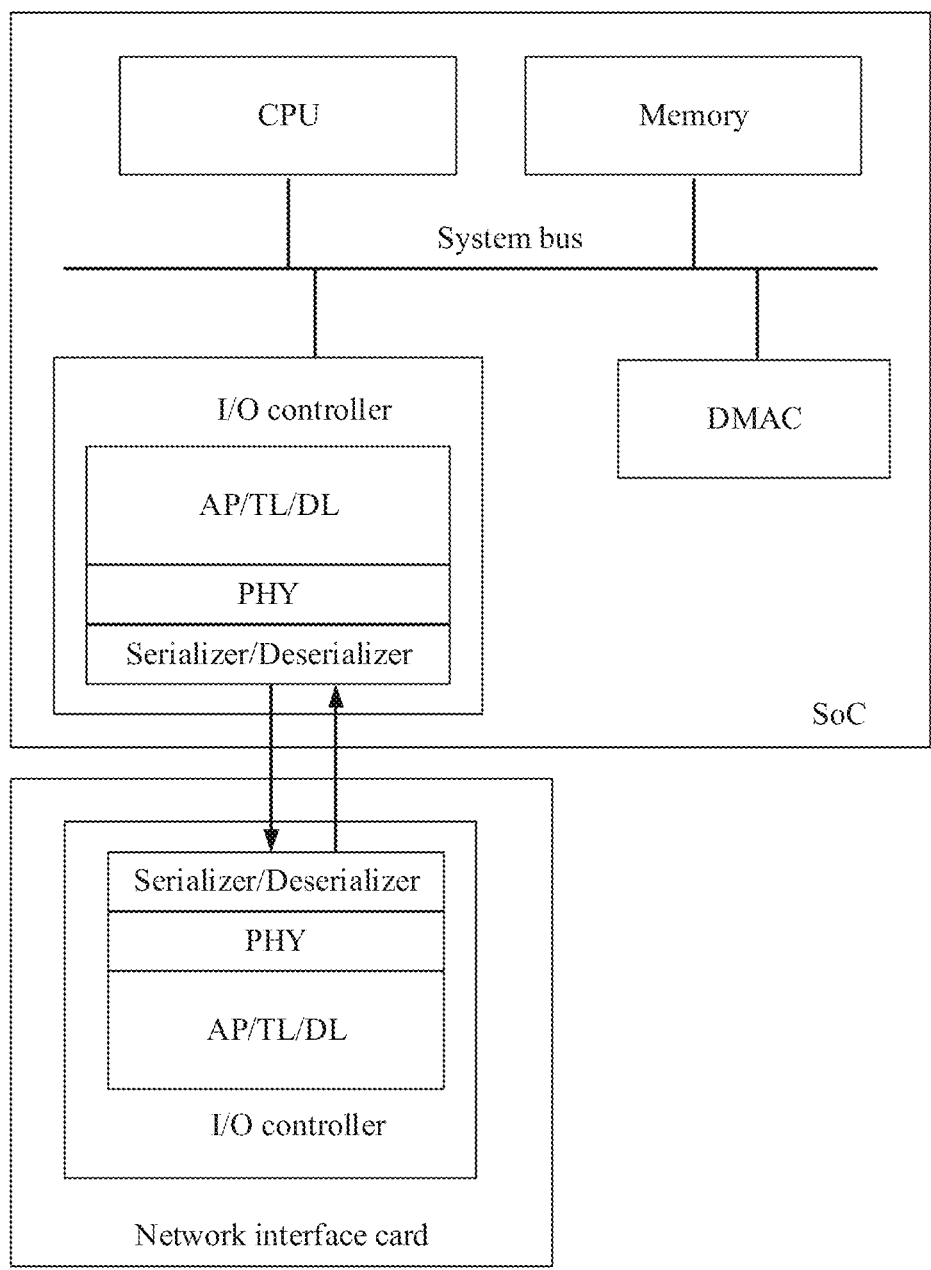
FIG. 1 is a schematic of an application architecture of a high-speed serial interface according to an embodiment of this disclosure.

For ease of understanding, some concepts related to embodiments of this disclosure are described as examples for reference, as shown below:

SerDes: a time-division multiplexing (TDM) and point-to-point (P2P) serial communication technology. A plurality of low-speed parallel signals is converted into high-speed serial signals at a transmit end of the SerDes. The high-speed serial signals pass through a transmission medium (an optical cable or a copper wire). Finally, the high-speed serial signals are converted back into low-speed parallel signals at a receive end of the SerDes. In this point-to-point serial communication technology, a channel capacity of the transmission medium is fully utilized, to reduce quantities of transmission channels and device pins to be used and increase a signal transmission speed, so that communication costs are greatly reduced.

PCIe: high-speed serial point-to-point dual-channel transmission at high bandwidth. Exclusive channel bandwidth is allocated to a device connected through the PCIe, and the device does not share bus bandwidth. The PCIe mainly supports active power management, error reporting, end-to-end reliable transmission, hot swap, quality of service (QOS), and other functions.

Hamming code (Bose Ray-Chaudhuri Hocquenghem (BCH)): a widely studied coding method among error-correcting codes, used to correct multi-level, cyclic, error-correcting, and variable-length digital codes in a plurality of random error patterns.

The following describes technical solutions in embodiments of this disclosure with reference to accompanying drawings in embodiments of this disclosure. In descriptions of embodiments of this disclosure, "/" indicates "or", unless otherwise specified. For example, A/B may indicate A or B. The term "and/or" in this specification describes only an association relationship between associated objects, and indicates that three relationships may exist. For example, A and/or B may indicate the following three cases: only A exists, both A and B exist, and only B exists. In addition, in descriptions of embodiments of this disclosure, "a plurality of" means two or more.

The terms "first" and "second" used below are merely intended for a purpose of description, and shall not be understood as an indication or an implication of relative importance or an implicit indication of a quantity of indicated technical features. Therefore, a feature limited by "first" or "second" may explicitly or implicitly include one or more features. In descriptions of embodiments, "a plurality of" means two or more, unless otherwise specified.

Low-power states such as L0s, L1, and L2 are defined in a PCIe specification. When no service packet is transmitted on a link for a specific period of time, a low-power state is initiated to reduce power consumption of the link.

L0s indicates that a local TX and a peer RX are paired and enter or exit a low-power state together, where a delay of entering or exiting the low-power state is several microseconds. L1 indicates that a low-power state is simultaneously exited in a TX direction and an RX direction, where a delay of entering or exiting the low-power state is tens of microseconds. Power consumption is reduced by a higher percentage in L1 than that in L0s, and power consumption is reduced by a higher percentage in L2 than that in L1. The L1 low-power state is used as an example. A working process in which a link enters the low-power state may be as follows:

(1) A power management module of PCIe monitors whether no transaction layer packet (TLP) is transmitted in a sending direction or a receiving direction of the link within a continuous period of time T.

(2) After determining that T is greater than a configured threshold, the power management module of the PCIe determines to initiate a process of entering the L1 low-power state.

(3) The power management module of the PCIe sends a request for entering the L1 low-power state to a PHY of the PCIe.

(4) After receiving the request from the power management module, the PHY of the PCIe negotiates with a peer device on entering the L1 low-power state. In the L1 state, the PHY of the PCIe and a TX and an RX of a SerDes of the PCIe are also in a power saving state.

(5) After determining that a process of negotiating with the peer device on entering the L1 low-power state is completed, the PHY of the PCIe reports, to the power management module of the PCIe, that the L1 low-power state is successfully entered.

(6) After receiving an indication indicating that the PHY has entered the L1 state, the power management module of the PCIe indicates a controller of the PCIe to enter the L1 low-power state.

The L1 low-power state is still used as an example. A working process of exiting the low-power state may be as follows:

(1) The power management module of the PCIe monitors whether a TLP request is sent in the sending direction of the link.

(2) When detecting that a TLP is sent, the power management module of the PCIe initiates a process of exiting the L1 low-power state.

(3) The power management module of the PCIe sends a request for exiting the L1 low-power state to the PHY of the PCIe.

(4) After receiving the request from the power management module of the PCIe, the PHY of the PCIe negotiates with the peer device on exiting the L1 low-power state. In this process, both the TX and the RX of the SerDes of the PCIe are controlled by the PHY of the PCIe. This is equivalent to that both the PHY and the SerDes of the PCIe exit the power saving state.

(5) After completing a process of negotiating with the peer device on exiting the L1 low-power state, the PHY of the PCIe reports, to the power management module, an indication indicating that the L0 low-power state is successfully entered.

(6) After receiving the indication indicating that the PHY of the PCIe has entered the L0 lower-power state, the power management module of the PCIe also indicates the controller of the PCIe to enter the L0 low-power state.

First, it can be learned from the process of entering the L1 low-power state and the process of exiting the L1 low-power state that sending of service data on the link needs to have stopped for a period of time before the controller of the PCIe, including the PHY and the SerDes of the PCIe and the like, enters the low-power state. The period of time is usually several microseconds or milliseconds. However, when an interval for sending service data is shorter than this time, a low power mechanism cannot take effect, and power consumption of the link still cannot be reduced.

In addition, in a PCIe protocol, when no service data is transmitted on a link within a short period of time, invalid idle data needs to be inserted in a TX direction for data padding. However, the idle data still passes through circuits such as an FEC circuit and a scrambling circuit at a PHY, the circuits such as the FEC circuit and the scrambling circuit at the PHY still cause high power consumption, and power consumption of the link still cannot be reduced.

In addition, in PCIe, in the case of entering a low-power state or exiting a low-power state, a SerDes in a controller of the PCIe also enters the low-power state when the controller of the PCIe enters the low-power state. Consequently, a delay of entering the low-power state and a delay of exiting the low-power state are high, and are usually tens of microseconds. In addition, when a link enters a low-power state or exits a low-power state, service data is blocked. In the case of frequently entering the low-power state and exiting the low-power state, high-speed input/output (I/O) interface in a SerDes in the link is frequently used for a switching process, and cannot send service data. This affects performance of the high-speed I/O interface to some extent, and fast switching cannot be implemented.

Therefore, this disclosure provides a high-speed serial interface. For example, the high-speed serial interface may be used in PCIe, Ethernet, or another network architecture.

In this disclosure, when a transmit end sends service data, a monitor in the high-speed serial interface may monitor whether service data is still being sent at a PHY. When determining that no service data is being sent, the monitor triggers a CLK_GAT to stop sending a clock signal to partial modules in a PHY circuit at the transmit end. This is equivalent to that the partial modules in the PHY circuit at the transmit end are turned off. In addition, a control bitstream generation circuit is triggered to generate a first control bitstream. The first control bitstream is equivalent to a switch for performing indication to partial modules in a PHY circuit at a remote end, namely, a receive end, and is used to indicate the partial modules in the PHY circuit at the receive end to be turned off. When detecting the first control bitstream, a bitstream detection circuit at the receive end also triggers a CLK_GAT at the receive end to turn off the partial modules in the PHY circuit at the receive end. In this method in which the CLK_GAT and the control bitstream are used to make the partial modules in the PHY circuit at the transmit end and the partial modules in the PHY circuit at the receive end to enter a low-power state, a response speed is usually several nanoseconds. The response speed is far lower than that in another technology in which a process of entering an L1 low-power state, an L0s low-power state, or the like in PCIe takes a time of several microseconds or milliseconds, so that power consumption of a link is greatly reduced.

Similarly, in this disclosure, a process of exiting the low-power state and entering normal service data transmission may be implemented by using a second control bitstream. In this way, switching time spent on exiting the low-power state and entering the normal service data transmission is shorter than the time spent on exiting the L1 low-power state or the L0s low-power state in the PCIe, and a response speed is higher.

In addition, in the high-speed serial interface in this disclosure, when the CLK_GAT at the transmit end does not send a clock signal to the PHY circuit at the transmit end, the partial modules in the PHY circuit at the transmit end may be turned off. This includes that an FEC encoding circuit, a scrambling circuit, and the like in the PHY circuit at the transmit end are turned off and do not work normally. When the CLK_GAT at the receive end does not send a clock signal to the partial modules in the PHY circuit at the receive end, the partial modules in the PHY circuit at the receive end are turned off. This includes that an FEC decoding circuit, a descrambling circuit, and the like at a PHY at the receive end are turned off and do not work normally. In an existing PCIe protocol, if no service data is transmitted in a low-power state, idle data is still inserted in a sending direction and still passes through an FEC circuit, a scrambling/descrambling circuit, and the like. This still causes high power consumption. However, in this disclosure, the partial modules in the PHY circuit at the transmit end and the partial modules in the PHY circuit at the receive end cannot work normally. This includes that the FEC circuit, the scrambling/descrambling circuit, and the like at the PHY do not work normally either. Therefore, power consumption of a link can be greatly reduced.

In addition, in PCIe in another technology, when a link enters a low-power working state, a SerDes in the link also enters a low-power state. However, in this disclosure, after the first control bitstream is sent, when the PHY circuit is turned off, a TX circuit of the SerDes may still be in a working state, and continue to send a random bitstream. Naturally, an RX circuit of a SerDes at the receive end is also in a working state, and continues to receive the random bitstream. This can ensure that the CDR circuit in the SerDes is in a stable locked state, and can reduce impact on performance of high-speed I/O.

It should be understood that the high-speed serial interface in this disclosure includes an RX circuit and a TX circuit. When there are high-speed serial interfaces on two sides for transmitting service data, a TX circuit of a high-speed serial interface on one side may cooperate with an RX circuit of a high-speed serial interface on the other side.

In some embodiments, as shown in FIG. 1, a high-speed serial interface on one side may be included in a system-on-a-chip (SoC), and a high-speed serial interface on the other side may be included in a network interface card (Network Card), for example, an Ethernet network interface card. The SoC may be connected to the network interface card through the high-speed serial interface. Service data may be transmitted between the SoC and the network interface card, and the SoC may communicate with an external network by using the network interface card.

As shown in FIG. 1, the high-speed serial interface is integrated in an I/O controller of the SoC, and is connected to a system bus of the SoC. A central processing unit (CPU), a direct memory access controller (DMAC), a memory, and other components are further connected to the system bus.

In some embodiments, in this disclosure, the high-speed serial interface of the SoC is considered as a high-speed serial interface at a transmit end. This is equivalent to that a PHY circuit in the high-speed serial interface is improved. On a basis that the high-speed serial interface of the SoC includes a circuit of an application layer (AP)/transport layer (TL)/DL, a PHY, and a SerDes, a monitor, a CLK_GAT, a control bitstream generation circuit, and other circuits are added to the high-speed serial interface.

Similarly, the network interface card also includes a high-speed serial interface, and the high-speed serial interface is integrated in an I/O controller of the SoC. The high-speed serial interface in the network interface card may be considered as a high-speed serial interface at a receive end, and the high-speed serial interface at the receive end is also improved. On a basis that the high-speed serial interface controller in the network interface card includes an AP/TL/DL, a PHY, and a SerDes, a CLK_GAT, a bitstream detection circuit, and the like are added.

The high-speed serial interface in the SoC may be connected to an external network interface card through the SerDes in the high-speed serial interface, to constitute a chip system with a high-speed I/O interface.

It should be understood that the high-speed serial interface in the SoC may alternatively serve as a high-speed serial interface at a receive end, and the high-speed serial interface in the network interface card may alternatively serve as a high-speed serial interface at a transmit end. To be specific, the high-speed serial interface in the SoC not only includes a high-speed serial interface at a transmit end, but also includes a high-speed serial interface at a receive end, and the high-speed serial interface in the network interface card not only includes a high-speed serial interface at a transmit end, but also includes a high-speed serial interface at a receive end.

Figure 2:
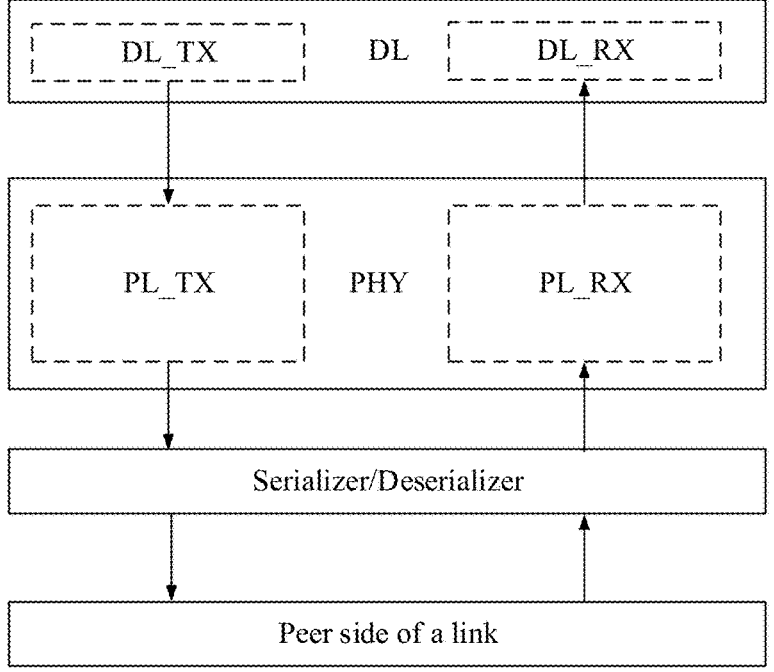
FIG. 2 is a schematic of a signal flow in which a DL, a PHY, and a SerDes on one side communicate with a peer side of a link in a sending direction and a receiving direction according to an embodiment of this disclosure.

The following further describes a system framework including a DL and a PHY in a high-speed serial interface at a transmit end and a DL and a PHY in a high-speed serial interface at a receive end. Refer to FIG. 2. It should be understood that a transmit end also includes an RX circuit, and a receive end also includes a TX circuit. FIG. 2 shows a signal flow in which a DL, a PHY, and a SerDes on one side communicate with a peer side of a link in a sending direction and a receiving direction. A data path of the DL includes two directions: DL_TX and DL_RX. A data path of the PHY also includes two directions: PL_TX and PL_RX. The PHY includes high-power circuits such as an FEC circuit and a scrambling/descrambling circuit. The DL_TX is partial modules at a DL at a transmit end, and may be a TX circuit at the DL at the transmit end. The DL_RX is partial modules at a DL at a receive end, and may be an RX circuit at the DL at the receive end. The PL_TX is partial modules in a PHY circuit at the transmit end, and may be a TX circuit in a PHY circuit at the transmit end. The PL_RX is partial modules in a PHY circuit at the receive end, and may be an RX circuit in the PHY circuit at the receive end. The PL_TX may receive data from the DL_TX, the data is encoded by an FEC encoding circuit, a scrambling circuit, and the like in the PHY, and then encoded data is sent to the SerDes. The PL_RX may receive data from a SerDes on the peer side, the data is decoded by a descrambling circuit and the like in the PHY, and then decoded data is sent to a DL_RX on the peer side for further processing.

It should be noted that, in this disclosure, the PL_TX in the PHY circuit at the transmit end is not limited to including only the FEC encoding circuit and the scrambling circuit, and may further include another power-consuming TX circuit. Similarly, in this disclosure, the PL_RX at the receive end is not limited to including only an FEC decoding circuit and the descrambling circuit, and may further include another power-consuming RX circuit. For example, the TX circuit in the PHY circuit at the transmit end may further include a data distribution circuit, and the PL_RX at the receive end may further include a symbol lock circuit, a deskew circuit, and the like.

This disclosure is equivalent to improvement on a peripheral circuit of the PHY. A monitor, a CLK_GAT, a control bitstream generation circuit, and the like are added to a periphery of a PHY at the transmit end. A bitstream detection circuit, a CLK_GAT, and the like are added to a periphery of a PHY at the receive end.

In some embodiments, a random bitstream generation circuit is further added to the periphery of the PHY at the transmit end, and is configured to generate a random bitstream.

Figure 3A:
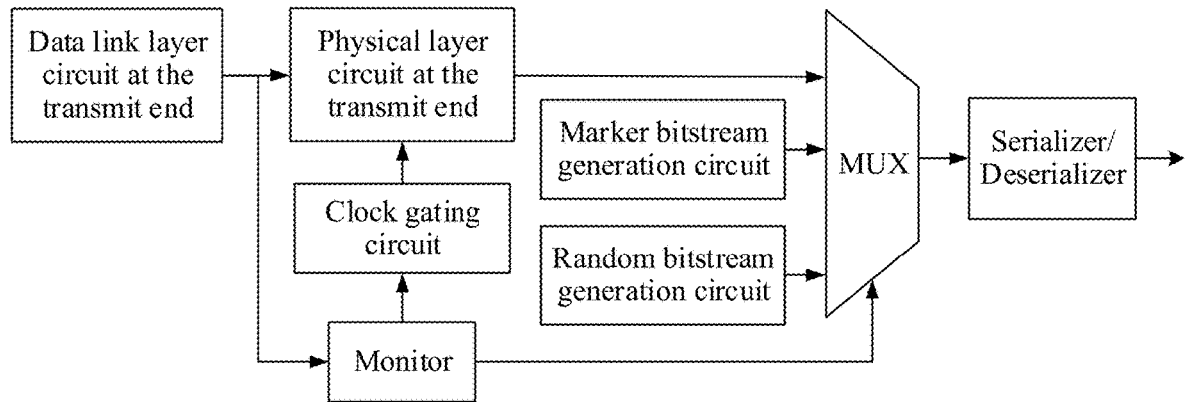
FIG. 3A is a schematic of a circuit of a high-speed serial interface at a transmit end according to an embodiment of this disclosure.

The following first describes a high-speed serial interface at a transmit end in this disclosure. The high-speed serial interface includes a DL circuit at the transmit end, a PHY circuit at the transmit end, a monitor, a CLK_GAT, a control bitstream generation circuit, a random bitstream generation circuit, and a SerDes, and further includes the following circuits. FIG. 3A is a schematic of a structure of a high-speed serial interface at a transmit end.

The monitor is configured to: when the transmit end is not sending service data, indicate the CLK_GAT to stop sending a clock signal to partial modules in the PHY circuit at the transmit end.

The CLK_GAT is configured to stop sending the clock signal to the partial modules in the PHY circuit at the transmit end.

The control bitstream generation circuit is configured to: when it is determined that the CLK_GAT has stopped sending the clock signal, send a first control bitstream through the SerDes, where the first control bitstream is used to indicate that the transmit end has turned off the partial modules in the PHY circuit at the transmit end, or the first control bitstream is used to indicate that the transmit end is to turn off the partial modules in the PHY circuit at the transmit end, or the first control bitstream is used to indicate a receive end to turn off partial modules in a PHY circuit at the receive end. This is equivalent to that the first control bitstream does not pass through the partial modules in the PHY circuit at the transmit end after the partial modules in the PHY circuit at the transmit end are turned off.

The random bitstream generation circuit is configured to send a random bitstream to the SerDes. This is equivalent to that the random bitstream does not pass through the partial modules in the PHY circuit at the transmit end after the partial modules in the PHY circuit at the transmit end are turned off.

In this way, when the transmit end is not sending service data, the partial modules in the PHY circuit of the high-speed serial interface at the transmit end are turned off, and the transmit end also sends the first control bitstream to indicate that the transmit end has turned off the partial modules in the PHY circuit at the transmit end, or the first control bitstream is used to indicate that the transmit end is to turn off the partial modules in the PHY circuit at the transmit end, or the first control bitstream is used to indicate the receive end to turn off the partial modules in the PHY circuit at the receive end. This is equivalent to that the receive end may also turn off the PHY circuit at the receive end when determining that the transmit end has no service data to send, to reduce power consumption at the transmit end and and the receive end. In this disclosure, the random bitstream may be further sent, so that the SerDes, namely, a SerDes, in the high-speed serial interface is in a working state.

For example, as shown in FIG. 3B, the partial modules in the PHY circuit at the transmit end are a TX circuit, namely, a PL_TX, in the PHY circuit at the transmit end.

In this case, the monitor is configured to: monitor whether a DL_TX is sending service data to the PL_TX, and when it is determined that the DL_TX is not sending service data to the PL_TX, indicate the CLK_GAT to stop sending a clock signal to the PL_TX; the CLK_GAT is configured to stop sending the clock signal to the PL_TX; and the control bitstream generation circuit (marker insert) is configured to: when it is determined that the CLK_GAT has stopped sending the clock signal, send a first control bitstream, where the first control bitstream is used to indicate a receive end of service data to turn off a PL_RX.

In some embodiments, a multiplexer circuit (MUX) is further included, and is configured to choose to output service data, or choose to output the first control bitstream when receiving an indication indicating to output the first control bitstream.

When the CLK_GAT is configured to stop sending the clock signal to the PL_TX, this is equivalent to stopping sending, to the PL_TX, a pulse signal used to transmit service data. If the PL_TX does not receive the clock signal, an FEC encoding circuit and a scrambling circuit in the PL_TX cannot work normally, and the PL_TX no longer outputs service data to the MUX.

Therefore, if it is determined that the DL_TX is not sending service data to the PL_TX, the high-speed serial interface on the generation end may turn off the PL_TX by using the CLK_GAT. In addition, the control bitstream generation circuit may also generate the first control bitstream indicating to turn off the PL_RX at the receive end.

It should be noted that, in this disclosure, sending of the clock signal may be stopped to turn off some corresponding modules. In other words, stopping sending the clock signal to partial modules is equivalent to turning off the partial modules.

For example, the CLK_GAT stops sending the clock signal, to turn off the partial modules in the PHY circuit at the transmit end. In other words, that the CLK_GAT stops sending the clock signal to the partial modules in the PHY circuit at the transmit end is equivalent to turning off the partial modules in the PHY circuit at the transmit end.

Correspondingly, a high-speed serial interface at a receive end in this disclosure is further described.

At the receive end, as shown in (a) in FIG. 4, the high-speed serial interface includes a DL circuit at the receive end, a PHY circuit at the receive end, a bitstream detection circuit, a CLK_GAT, and a SerDes. The bitstream detection circuit is configured to receive a first control bitstream through the SerDes, where the first control bitstream is used to indicate that a transmit end has turned off partial modules in a PHY circuit at the transmit end, or the first control bitstream is used to indicate that the transmit end is to turn off partial modules in the PHY circuit at the transmit end, or the first control bitstream is used to indicate the receive end to turn off partial modules in the PHY circuit at the receive end.

The bitstream detection circuit is further configured to indicate the CLK_GAT to stop sending a clock signal to the partial modules in the PHY circuit at the receive end.

The CLK_GAT is configured to stop sending the clock signal to the partial modules in the PHY circuit at the receive end.

The bitstream detection circuit is further configured to receive a random bitstream through the SerDes.

For example, as shown in (b) in FIG. 4, the partial modules in the PHY circuit in the high-speed serial interface at the receive end include a PL_RX at the receive end, and the high-speed serial interface further includes a DL_RX at the receive end, a bitstream detection circuit (marker check), and a CLK_GAT.

The bitstream detection circuit is configured to: when a first control bitstream is received and the first control bitstream is used to indicate to turn off the PL_RX, indicate the CLK_GAT to stop sending a clock signal to the PL_RX.

The CLK_GAT is configured to stop sending the clock signal to the PL_RX.

The bitstream detection circuit is further configured to receive a random bitstream through a SerDes, where the random bitstream does not pass through the PL_RX at the receive end.

To be specific, in the high-speed serial interface at the receive end, if the first control bitstream indicating to turn off the PL_RX is received, the CLK_GAT no longer sends the clock signal to the PL_RX. When the CLK_GAT stops sending the clock signal to the PL_RX, this is equivalent to skipping sending, to the PL_RX, a pulse signal used to receive service data. If the PL_TX does not receive the clock signal, an FEC decoding circuit and a descrambling circuit in the PL_RX cannot work normally, and the PL_RX no longer outputs service data to the DL_RX.

It should be noted that, in this disclosure, sending of the clock signal may be stopped to turn off some corresponding modules. In other words, stopping sending the clock signal to partial modules is equivalent to turning off the partial modules.

For example, the CLK_GAT stops sending the clock signal, to turn off the partial modules in the PHY circuit at the receive end. In other words, that the CLK_GAT stops sending the clock signal to the partial modules in the PHY circuit at the receive end is equivalent to turning off the partial modules in the PHY circuit at the receive end.

In this way, in this disclosure, when determining that no service data is to be sent on a link within a short period of time, the high-speed serial interface may control the PL_TX at the transmit end and the PL_RX at the receive end to be turned off. For example, high-power circuits such as the FEC circuit and the scrambling circuit in the PL_TX and high-power circuits such as the FEC circuit and the descrambling circuit in the PL_RX are turned off. This reduces power consumption of the link.

In addition, in this disclosure, on a basis that the PL_TX at the transmit end is turned off, when the first control bitstream is used to indicate the PL_RX to be also turned off, the first control bitstream is equivalent to a switch for indicating to turn off a circuit. Compared with an existing PCIe protocol or the like in which a delay of entering or exiting a low-power state is several microseconds or milliseconds, a response speed of the switch used in this disclosure may be several nanoseconds, and the response speed is high.

On the basis of the high-speed serial interface shown in FIG. 3A, FIG. 3B, and FIG. 4, FIG. 5 shows a high-speed serial interface at a transmit end. The high-speed serial interface at the transmit end further includes a SerDes TX, namely, a TX circuit of a SerDes, configured to output service data or a first control bitstream.

In some embodiments, after the transmit end completes sending the first control bitstream, to ensure that the SerDes continuously transmits data and does not fail, the high-speed serial interface at the transmit end may further include a random bitstream generation circuit, configured to generate a random bitstream, so that a CDR circuit in the SerDes is in a locked state. The random bitstream includes 0s and 1s that are balanced in quantities.

In this disclosure, that the CDR circuit in the SerDes is in the locked state may be understood as that the CDR circuit in the SerDes remains in a data transmission state and does not enter a low-power state. For the transmit end, that the CDR circuit in the SerDes is in the locked state may be understood as that the CDR circuit in the SerDes is configured to continuously send data, for example, send the service data, the first control bitstream, or the random bitstream. For a receive end, that the CDR circuit in the SerDes is in the locked state may be understood as that the CDR circuit in the SerDes is configured to continuously receive data, for example, receive the service data, the first control bitstream, or the random bitstream.

Figure 5:
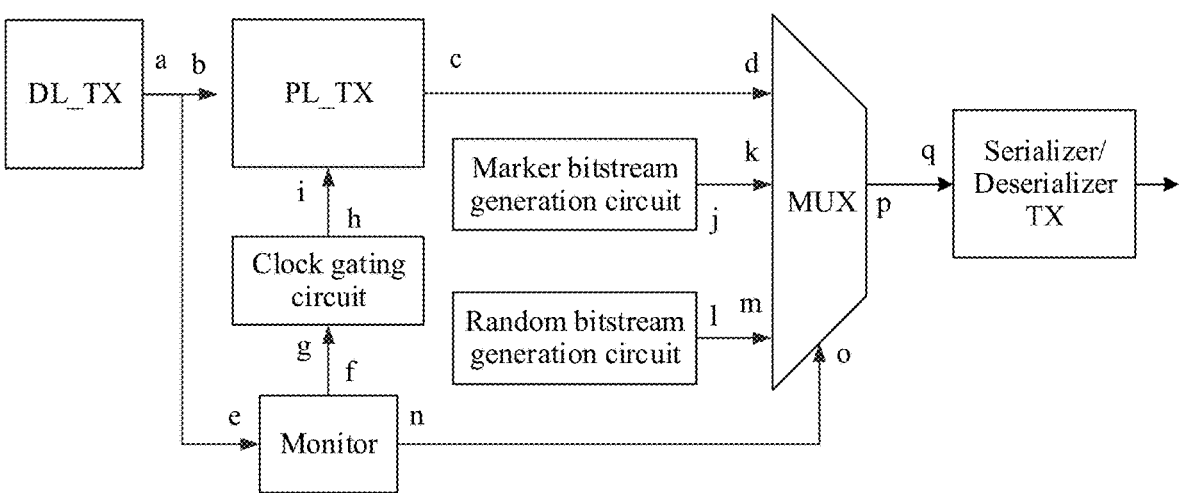
FIG. 5 is a schematic of a circuit of a high-speed serial interface at a transmit end according to an embodiment of this disclosure.

As shown in FIG. 5, a first end a of a DL_TX is coupled to a first end b of a PL_TX, a second end c of the PL_TX is coupled to a first end d of a MUX circuit, a first end e of a monitor is coupled between the first end a and the first end b, a second end f of the monitor is coupled to a first end g of a CLK_GAT, a second end h of the CLK_GAT is coupled to a third end i of the PL_TX, a first end j of a control bitstream generation circuit is coupled to a second end k of the MUX circuit, a first end l of a random bitstream generation circuit is coupled to a third end m of the MUX circuit, a third end n of the monitor is coupled to a fourth end o of the MUX, a fifth end p of the MUX is coupled to a first end q of the SerDes TX, and a link is established between an output end of the SerDes TX and a SerDes RX at the receive end.

The DL_TX is a sending-direction circuit at a DL, and is configured to send service data to the PL_TX.

The PL_TX is a sending-direction circuit at a PHY, and is configured to receive service data from the DL_TX, encode the service data by using an FEC circuit, a scrambling circuit, and the like in the PL_TX, and then send encoded service data to the SerDes TX through the MUX circuit.

The CLK_GAT is configured to perform gating on a clock that is input to each module in the PL_TX. For example, when an enable value of an input clock signal is 1, it indicates that the CLK_GAT is to be turned on; or when an enable value of an input clock signal is 0, it indicates that the CLK_GAT is to be turned off.

The monitor is configured to monitor whether the DL_TX is sending service data to the PL_TX.

The control bitstream generation circuit is configured to: when it is determined that the PL_TX is turned off, insert a marker indicating that a circuit is off into to-be-sent data; or when it is determined that the PL_TX is turned on, insert a marker indicating that a circuit is on into to-be-sent data; and send the data to the SerDes TX through the MUX circuit, so that the receive end identifies an action of turning on or turning off a PHY circuit.

The random bitstream generation circuit is configured to: when it is determined that the local PL_TX is turned off, send an invalid random bitstream to the SerDes TX through the MUX.

The SerDes TX is a sending-direction circuit of the SerDes, and is configured to convert parallel data sent by the PL_TX into serial bitstreams, and send the serial bitstreams to the link.

Based on the foregoing descriptions of the high-speed serial interface at the transmit end, a process of sending data by the high-speed serial interface at the transmit end includes the following process.

(1) The DL_TX sends service data to the PL_TX.

(2) The PL_TX performs PHY encoding, such as FEC encoding and byte distribution, on the service data and scrambles the service data by using the scrambling circuit, and then sends processed service data to the MUX circuit, so that the MUX circuit sends the processed service data to the receive end through the SerDes TX.

(3) When the monitor determines that the DL_TX is not sending service data, the monitor indicates the CLK_GAT to stop sending a clock signal to the PL_TX, and triggers the control bitstream generation circuit to send a first control bitstream to the SerDes TX through the MUX circuit.

(4) When determining that sending of the first control bitstream is completed, the monitor triggers the random bitstream generation circuit to send a random bitstream, to be specific, send the random bitstream to the SerDes TX through the MUX.

Figure 6:
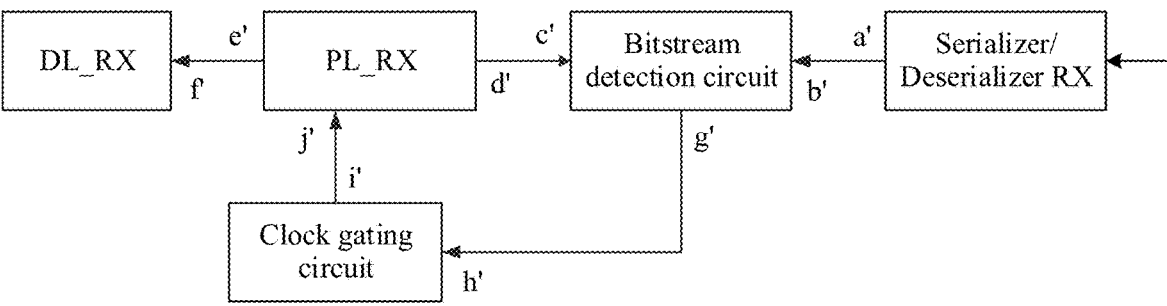
FIG. 6 is a schematic of a circuit of a high-speed serial interface at a receive end according to an embodiment of this disclosure.

Correspondingly, on a basis of the high-speed serial interface shown in FIG. 3 and FIG. 4, FIG. 6 shows a high-speed serial interface at a receive end. The high-speed serial interface at the receive end further includes a SerDes RX, namely, an RX circuit of a SerDes, configured to receive service data, a first control bitstream, a random bitstream, or the like.

As shown in FIG. 6, a first end a' of the SerDes RX is coupled to a first end b' of a bitstream detection circuit, a second end c' of the bitstream detection circuit is coupled to a first end d' of a PL_RX, a second end e' of the PL_RX is coupled to a first end f of a DL_RX, a third end g' of the bitstream detection circuit is coupled to a first end h' of a CLK_GAT, a second end i' of the CLK_GAT is coupled to a third end j' of the PL_RX.

The SerDes RX is configured to receive serial data from a link, perform serial-to-parallel conversion, and send parallel data to the PL_RX through the bitstream detection circuit.

The bitstream detection circuit is configured to detect whether a bitstream output by the SerDes RX includes a control bitstream indicating to turn on or turn off a circuit, and determine, based on the control bitstream, whether to turn on the PL_RX or turn off the PL_RX.

The CLK_GAT is configured to perform gating on a clock signal that is input to each module in the PL_RX, where the clock signal indicates to turn on or turn off the PL_RX. For example, when an enable value of an input clock signal is 1, it indicates that the PL_RX circuit is to be turned on; or when an enable value of an input clock signal is 0, it indicates that the PL_RX circuit is to be turned off.

The PL_RX is a receiving-direction module at a PHY, and is configured to receive service data sent by the SerDes RX through the bitstream detection circuit, perform PHY decoding, descrambling, and the like on the service data, and then send processed service data to the DL_RX.

The DL_RX is a receiving-direction module at a DL, and is configured to receive and process the service data output by the PL_RX.

Based on the foregoing descriptions of the high-speed serial interface at the receive end, a process of receiving data by the high-speed serial interface at the receive end includes the following process.

(1) The SerDes RX receives serial data sent by a transmit end, converts the serial data into parallel data, and sends the parallel data to the bitstream detection circuit.

(2) The bitstream detection circuit detects received data; and if service data is detected, sends the service data to the PL_RX circuit; or if a first control bitstream is detected, triggers the CLK_GAT to stop sending a clock signal to the PL_RX circuit; or if a random bitstream is detected, discards the random bitstream.

(3) The bitstream detection circuit sends the service data to the PL_RX circuit. The PL_RX circuit performs descrambling, FEC decoding, and the like on the service data, and then sends processed data to the DL_RX.

Therefore, in this disclosure, when no service data is currently being sent on the link, the high-speed serial interface may control the PL at the transmit end and the PL at the receive end to be turned off, to reduce power consumption of the link. In addition, in this disclosure, the control bitstream is used to indicate to turn on or turn off a circuit, so that a response speed can be increased. In addition, in this disclosure, after sending of the control bitstream is completed, the random bitstream may be further sent, to ensure that CDR in the transmit-end SerDes and the receive-end SerDes in the high-speed serial interface are in a stable locked state, so that an interface bit error and other problems are not likely to occur.

Corresponding to a process of reducing power consumption, if a first control bitstream is sent to turn off a PHY circuit at a peer end, when sending of service data is resumed, a second control bitstream may be further sent to turn on the PHY circuit at the peer end. With reference to transmit-end and receive-end circuit implementations of a high-speed serial interface in this disclosure, the following further describes a process of turning off a PL_TX and a PL_RX and a process of turning on the PL_TX and the PL_RX in this disclosure.

A: This disclosure provides a data transmission method. As shown in FIG. 7, the method is applied to a high-speed serial interface at a transmit end. The high-speed serial interface includes a PHY circuit. The method includes the following steps.

701: The transmit end sends a first control bitstream when the transmit end is not sending service data, where the first control bitstream is used to indicate that the transmit end has turned off partial modules in the PHY circuit at the transmit end, or the first control bitstream is used to indicate that the transmit end is to turn off partial modules in the PHY circuit at the transmit end, or the first control bitstream is used to indicate a receive end to turn off partial modules in a PHY circuit at the receive end.

Figure 9:
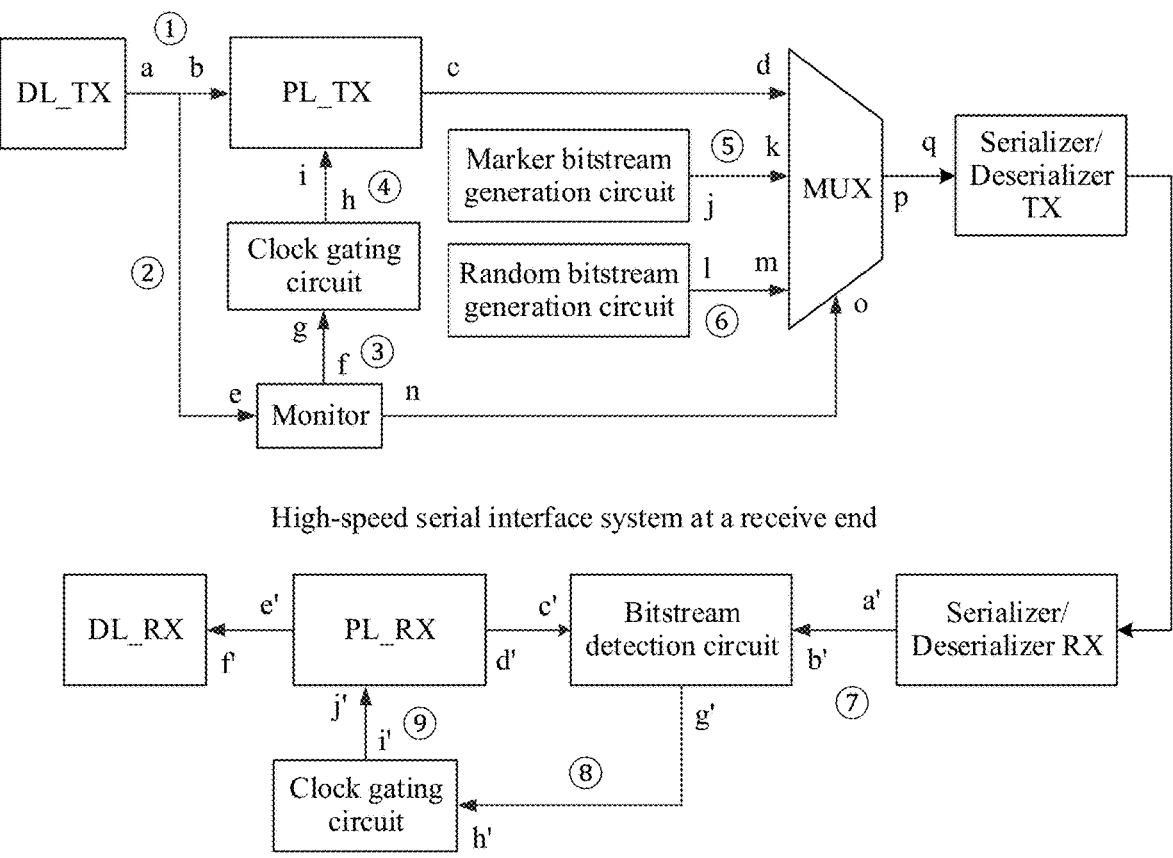
FIG. 9 is a schematic flowchart of turning off a transmitter (TX) circuit in a PHY circuit (PL_TX) and an RX circuit in a PHY circuit (PL_RX) according to an embodiment of this disclosure.

For specific implementation of step 701, refer to the following descriptions of steps ①, ②, and ⑤ in FIG. 9.

702: The transmit end turns off the partial modules in the PHY circuit at the transmit end.

For specific implementation of step 701, refer to the following descriptions of steps ③ and ④ in FIG. 9.

It should be noted that a sequence of turning off, by the transmit end, the partial modules in the PHY circuit at the transmit end and sending, by the transmit end, the first control bitstream is not limited in this disclosure. To be specific, optionally, the transmit end sends the first control bitstream after the transmit end turns off the partial modules in the PHY circuit at the transmit end; optionally, the transmit end turns off the partial modules in the PHY circuit at the transmit end in a process in which the transmit end sends the first control bitstream; or optionally, the transmit end turns off the partial modules in the PHY circuit at the transmit end after the transmit end completes sending the first control bitstream.

703: The transmit end sends a random bitstream.

For specific implementation of step 703, refer to the following descriptions of step ⑥ in FIG. 9.

A sequence of turning off, by the transmit end, the partial modules in the PHY circuit at the transmit end and sending, by the transmit end, the random bitstream is not limited in this disclosure either. To be specific, optionally, the transmit end sends the random bitstream after the transmit end turns off the partial modules in the PHY circuit at the transmit end; optionally, the transmit end turns off the partial modules in the PHY circuit at the transmit end in a process in which the transmit end sends the random bitstream; or optionally, the transmit end turns off the partial modules in the PHY circuit at the transmit end after the transmit end completes sending the random bitstream.

Correspondingly, for a high-speed serial interface, the high-speed serial interface includes a PHY circuit at a receive end. As shown in FIG. 8, the method includes the following steps.

801: The receive end receives a first control bitstream, where the first control bitstream is used to indicate that a transmit end has turned off partial modules in a PHY circuit at the transmit end, or the first control bitstream is used to indicate that the transmit end is to turn off partial modules in the PHY circuit at the transmit end, or the first control bitstream is used to indicate the receive end to turn off partial modules in the PHY circuit at the receive end.

For specific implementation of step 801, refer to the following descriptions of step ⑦ in FIG. 9.

802: The receive end turns off the partial modules in the PHY circuit at the receive end.

For specific implementation of step 802, refer to the following descriptions of steps ⑧ and ⑨ in FIG. 9.

803: The receive end receives a random bitstream.

The random bitstream does not pass through the partial modules in the PHY circuit at the receive end.

A sequence of turning off, by the receive end, the partial modules in the PHY circuit at the receive end and receiving, by the receive end, the random bitstream is not limited in this disclosure either. To be specific, optionally, the receive end receives the random bitstream after the receive end turns off the partial modules in the PHY circuit at the receive end; optionally, the receive end turns off the partial modules in the PHY circuit at the receive end in a process in which the receive end receives the random bitstream; or optionally, the receive end turns off the partial modules in the PHY circuit at the receive end after the receive end completes receiving the random bitstream.

For specific implementation of step 803, refer to the following descriptions of step ⑩ in FIG. 9.

It should be noted that a manner of turning off the partial modules in the PHY circuit includes: turning off a power supply of a related module, turning off a clock of a related module, stopping sending a clock signal to a related module, or the like, so that the partial modules in the PHY circuit are in a non-working state.

For example, in a circuit structure shown in FIG. 9, the partial modules in the PHY circuit at the transmit end are a PL_TX, and the partial modules in the PHY circuit at the receive end are a PL_RX. A process of turning off the PL_TX and the PL_RX may be as follows:

① After completing sending service data, a DL_TX stops sending service data to the PL_TX.

② A monitor detects that the DL_TX is not sending service data.

Each time the DL_TX sends a piece of service data to the PL_TX, the monitor receives a first signal, where the first signal indicates that the DL_TX is sending the service data to the PL_TX.

When time in which the DL_TX does not receive a first signal exceeds a preset time period, the monitor determines that the DL_TX is not sending service data to the PL_TX. For example, the preset time period herein may be 1 microsecond (μs) or 1 nanosecond (ns).

③ After waiting until the PL_TX completes sending service data output by the DL_TX, the monitor sends, to a first CLK_GAT, a request for turning off partial circuits of the PL_TX.

When the monitor determines that the DL_TX is not sending service data to the PL_TX, it is possible that the PL_TX has not completed sending, to a MUX, service data received from the PL_TX. Therefore, after waiting until the PL_TX completes sending the service data output by the DL_TX, for example, after waiting until an interval from time at which the PL_TX completes sending the last piece of service data exceeds a time period, the monitor determines that the PL_TX has completed sending the service data output by the DL_TX. In this case, the monitor starts a process of entering a low-power state, and sends, to the first CLK_GAT, the request for turning off the partial circuits of the PL_TX. The partial circuits of the PL_TX herein may include high-power circuits such as an FEC circuit and a scrambling circuit.

④ The first CLK_GAT turns off the partial circuits of the PL_TX.

It should be understood that the PL_TX may be triggered, by continuously receiving a clock signal from the first CLK_GAT, to send service data. When receiving the request for turning off the partial circuits of the PL_TX, the first CLK_GAT may turn off the partial circuits of the PL_TX by stopping sending the clock signal to the partial circuits of the PL_TX.

For example, the first CLK_GAT updates an enable value of the clock signal output to the partial circuits of the PL_TX from 1 to 0, to indicate to turn off the partial circuits of the PL_TX.

⑤ A control bitstream generation circuit sends a first control bitstream to a SerDes TX, where the first control bitstream indicates to turn off partial circuits of the PL_RX. The SerDes TX converts parallel data of the first control bitstream into serial data, and then sends the serial data to a link.

In some embodiments, when the monitor determines that the first CLK_GAT has turned off the partial circuits of the PL_TX, the monitor may trigger the control bitstream generation circuit to generate the first control bitstream, to control the partial circuits of the PL_RX at the receive end to be turned off. For example, the monitor sends a second signal to the control bitstream generation circuit, where the second signal is used to indicate the control bitstream generation circuit to send the first control bitstream. In this case, the monitor is coupled to the control bitstream generation circuit. The monitor may trigger the MUX circuit to choose to send the first control bitstream to the SerDes TX.

In some embodiments, in the high-speed serial interface at the transmit end, a global control circuit for controlling the high-speed serial interface runs. When the control circuit determines that the first CLK_GAT has turned off the partial circuits of the PL_TX, the control circuit may trigger the control bitstream generation circuit to generate the first control bitstream, and the control circuit triggers the MUX circuit to choose to send the first control bitstream to the SerDes TX.

⑥ A random bitstream generation circuit sends a random bitstream to the SerDes TX. The SerDes TX converts parallel data of the random bitstream into serial data, and then sends the serial data to the link.

In some embodiments, when determining that the control bitstream generation circuit has completed sending the first control bitstream, the monitor may trigger the random bitstream generation circuit to generate the random bitstream, so that the SerDes TX sends the random bitstream to the link. For example, when determining that the control bitstream generation circuit has completed sending the first control bitstream, the monitor sends a third signal to the random bitstream generation circuit, where the third signal is used to indicate the random bitstream generation circuit to send the random bitstream. In this case, the monitor is coupled to the random bitstream generation circuit. The monitor may trigger the MUX circuit to choose to send the random bitstream to the SerDes TX.

In some embodiments, when determining that the control bitstream generation circuit has completed sending the first control bitstream, the control circuit may trigger the random bitstream generation circuit to generate the random bitstream, and the control circuit triggers the MUX circuit to choose to send the random bitstream to the SerDes TX.

⑦ A SerDes RX converts the received serial data of the first control bitstream into parallel data, and then sends the parallel data to a bitstream detection circuit.

⑧ When identifying the first control bitstream as a bitstream indicating to turn off the partial circuits of the PL_RX, the bitstream detection circuit sends, to a second CLK_GAT, an indication indicating to turn off the partial circuits of the PL_RX.

In some embodiments, the first control bitstream includes a plurality of repeated marker identifiers, a first marker end identifier, and first bitstream content, and the first bitstream content indicates the receive end to turn off the partial circuits of the PL_RX. For specific implementation of the first control bitstream, refer to detailed descriptions of the first control bitstream below. The first marker end identifier is used to indicate a position of an end bit of the first control bitstream. The plurality of repeated marker identifiers is used to indicate that the first control bitstream is a control bitstream different from a service data bitstream.

It can be understood that the bitstream detection circuit continuously detects a bitstream output by the SerDes RX. If the first control bitstream is received and the first control bitstream is identified as a request for turning off the partial circuits of the PL_RX, the bitstream detection circuit may immediately send, to the second CLK_GAT, the indication indicating to turn off the partial circuits of the PL_RX.

⑨ When receiving the indication indicating to turn off the partial circuits of the PL_RX, the second CLK_GAT waits until the PL_RX completes service data processing, and then turns off the partial circuits of the PL_RX.

When the second CLK_GAT receives the indication indicating to turn off the partial circuits of the PL_RX, it is possible that the PL_RX has not completed sending, to a DL_RX, service data received from the SerDes RX. Therefore, the second CLK_GAT stops sending a clock signal to the PL_RX when determining that an interval from the last time at which the PL_RX sends service data to the DL_RX exceeds a preset time period. For example, the preset time period may be 1 ns or 2 ns.

When the partial circuits of the PL_RX are turned off, the partial circuits of the PL_RX enter a low-power state.

⑩ (not shown in FIG. 9) The SerDes RX receives a random bitstream, and sends the random bitstream to the bitstream detection circuit. The bitstream detection circuit discards the random bitstream after identifying the random bitstream.

B: In the case of turning on a PHY circuit, in a process at a transmit end, as shown in FIG. 10, the method may further include the following steps.

101: When the transmit end resumes sending service data, send a second control bitstream, where the second control bitstream is used to indicate that the transmit end has turned on partial modules in a PHY circuit at the transmit end, or the second control bitstream is used to indicate that the transmit end is to turn on partial modules in the PHY circuit at the transmit end, or the second control bitstream is used to indicate a receive end to turn on partial modules in a PHY circuit at the receive end.

Figure 12:
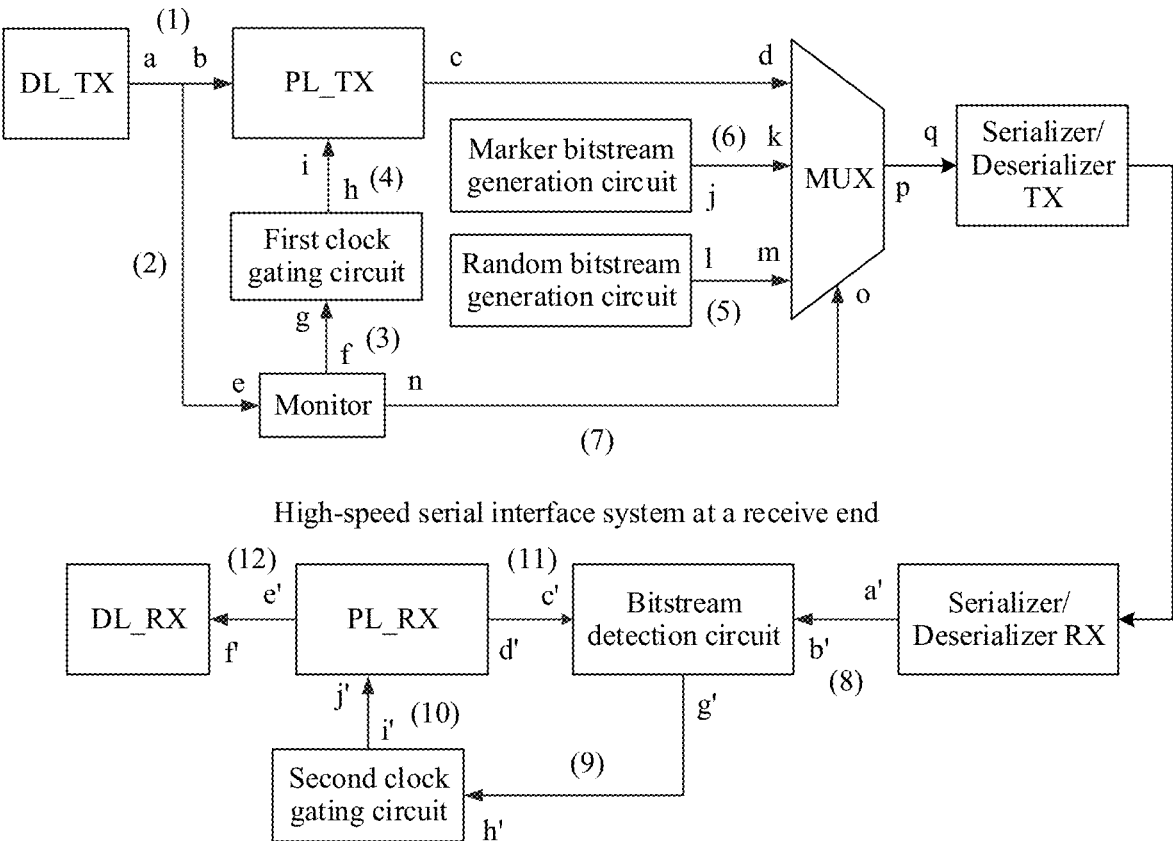
FIG. 12 is a schematic flowchart of turning on a PL_TX and a PL_RX according to an embodiment of this disclosure.

For specific implementation of step 101, refer to the following descriptions of steps (1), (2), and (6) in FIG. 12.

102: The transmit end turns on the partial modules in the PHY circuit at the transmit end.

For specific implementation of step 102, refer to the following descriptions of steps (3) and (4) in FIG. 12.

A sequence of turning on, by the transmit end, the PHY circuit at the transmit end and sending, by the transmit end, the second control bitstream is not limited in this disclosure either. To be specific, optionally, the transmit end sends the second control bitstream after the transmit end turns on the PHY circuit at the transmit end; optionally, the transmit end turns on the PHY circuit at the transmit end in a process in which the transmit end sends the second control bitstream; or optionally, the transmit end turns on the PHY circuit at the transmit end after the transmit end completes sending second control bitstream.

103: The transmit end controls the PHY circuit at the transmit end to send service data to a SerDes.

For specific implementation of step 102, refer to the following descriptions of steps (5) and (7) in FIG. 12.

Correspondingly, in a process at a receive end, as shown in FIG. 11, the method may further include the following steps.

111: The receive end controls a SerDes to receive a second control bitstream, where the second control bitstream is used to indicate that a transmit end has turned on partial modules in a PHY circuit at the transmit end, or the second control bitstream is used to indicate that the transmit end is to turn on partial modules in the PHY circuit at the transmit end, or the second control bitstream is used to indicate the receive end to turn on partial modules in a PHY circuit at the receive end.

For specific implementation of step 111, refer to the following descriptions of step (9) in FIG. 12.

112: The receive end turns on the partial modules in the PHY circuit at the receive end.

For specific implementation of step 112, refer to the following descriptions of step (10) in FIG. 12.

113: The receive end controls the PHY circuit at the receive end to receive service data transmitted through a SerDes.

For specific implementation of step 113, refer to the following descriptions of steps (8), (11), and (12) in FIG. 12.

It should be noted that a manner of turning on the partial modules in the PHY circuit includes: turning on a clock of a corresponding module, turning on a power supply of a corresponding module, or controlling a clock circuit to send a clock signal to a corresponding module, so that a PHY module is in a working state.

For example, in a circuit structure shown in FIG. 12, the partial modules in the PHY circuit at the transmit end are a PL_TX, and the partial modules in the PHY circuit at the receive end are a PL_RX. A process of turning on the PL_TX and the PL_RX may be as follows:

(1) A DL_TX receives service data sent by an upper layer, and starts to send the service data to the PL_TX.

To be specific, the DL_TX is restored to a service data transmission state.

(2) A monitor detects that the DL_TX starts to send the service data.

When the DL_TX starts to send the service data to the PL_TX, the DL_TX also sends a first signal to the monitor. That the monitor receives the first signal means that the monitor detects that the DL_TX resumes sending the service data to the PL_TX.

(3) The monitor indicates a first CLK_GAT to turn on partial circuits of the PL_TX.

To be specific, the monitor starts to perform a process of exiting a low-power state.

(4) The first CLK_GAT turns on the partial circuits of the PL_TX.

To be specific, the first CLK_GAT starts to send a clock signal to the partial circuits of the PL_TX. For example, an enable value of the clock signal is updated from 0 to 1.

(5) A random bitstream generation circuit stops sending a random bitstream.

In some embodiments, after sending an indication to the first clock gating, the monitor may send a fourth signal to the random bitstream generation circuit, to indicate the random bitstream generation circuit to stop sending the random bitstream. This is also equivalent to that the random bitstream generation circuit determines that the first CLK_GAT starts to send the clock signal to the partial circuits of the PL_TX.

In addition, the monitor indicates a MUX circuit to stop choosing to send the random bitstream and start to choose to send the service data.

(6) A control bitstream generation circuit sends a second control bitstream, where the second control bitstream is used to indicate the receive end to turn on the PL_RX.

In some embodiments, when indicating the first CLK-_GAT to start to send the clock signal, the monitor may further indicate the control bitstream generation circuit to send the second control bitstream.

In some embodiments, the second control bitstream includes a plurality of repeated marker identifiers, a second marker end identifier, and second bitstream content, and the second bitstream content indicates the receive end to turn on the PL_RX. The second bitstream content is used to indicate to turn off the PHY circuit. The second marker end identifier is used to indicate a position of an end bit of the second control bitstream. The plurality of repeated marker identifiers is used to indicate that the second control bitstream is a control bitstream different from a service data bitstream.

(7) When determining that sending of the second control bitstream is completed, the monitor indicates the MUX circuit to start to send the service data.

In some embodiments, when determining that an interval from time at which the control bitstream generation circuit completes sending the last piece of data of the second control bitstream exceeds a specific time period, the monitor determines that the sending of the second control bitstream is completed. In this case, the monitor may indicate the MUX circuit to choose to send, to a SerDes TX, service data received from the PL_RX. The SerDes TX converts parallel service data into serial data, and then sends the serial data to a link.

(8) A SerDes RX converts received serial service data into parallel data, and then sends the parallel data to a bitstream detection module.

(9) The bitstream detection module continuously detects a bitstream output by the SerDes RX, and when the second control bitstream is identified, indicates a second CLK_GAT to send a clock signal to the PL_RX.

To be specific, the bitstream detection module indicates the second CLK_GAT to turn on partial circuits of the PL_RX.

(10) The second CLK_GAT starts to send the clock signal to the PL_RX.

(11) The bitstream detection circuit sends, to the PL_RX, service data received after the second control bitstream.

(12) The PL_RX performs PHY decoding, descrambling, and the like on received service data, and then outputs processed service data to a DL_RX.

In this way, in this disclosure, the monitor, the CLK_GAT, the control bitstream generation circuit, the bitstream detection circuit, and other circuits cooperate with each other, to avoid a waste of power that occurs in a case in which the PHY circuit still works when the high-speed serial interface is not to send service data within a short period of time. In this disclosure, in a period in which no service data is sent on the link within a short period of time, the TX circuit of the PL at the transmit end may be controlled to be turned off, and the PL_RX at the receive end may be controlled to be turned off, to reduce power consumption of the link. The first control bitstream and the second control bitstream are equivalent to a switch for controlling a PL layer circuit. A response speed of the switch is usually several nanoseconds, and the speed is far higher than a speed of switching a low-power state, for example, L0s, L1, or L2, in PCIe. This resolves a problem that entry and exit processes take a long time during power switching by the high-speed serial interface.

In addition, it should be understood that, assuming that the transmit end and the receive end in the embodiments are a SoC and a network interface card respectively, in this disclosure, in a direction in which the SoC sends data to the network interface card, a TX circuit of a PL in the SoC may be controlled to be turned off or turned on, and a PL_RX in the network interface card may be controlled to be turned off or turned on. In addition, the SoC may alternatively serve as a receive end, and the network interface card serves as a transmit end. In this disclosure, in a direction in which the network interface card sends data to the SoC, a TX circuit of the PL in the network interface card may also be controlled to be turned off or turned on, and a PL_RX in the SoC may also be controlled to be turned off or turned on. To be specific, in this disclosure, an architecture and a process of turning on or turning off a PHY circuit in a sending direction are completely independent of those in a receiving direction on one side. In this disclosure, in a task running stage, service data transmission statuses in a sending direction and a receiving direction on one side may be distinguished. To be specific, a sending direction and a receiving direction in a link are independently monitored, and a PHY circuit in the sending direction or the receiving direction may be independently controlled. In other words, the sending direction and the receiving direction of the link may be enabled or disabled in parallel and independently, without affecting each other. However, directions cannot be distinguished in another PHY power switching. To be specific, in another manner, turning on or turning off a PHY circuit is equivalent to turning off both a TX circuit and a PL_RX on one side.

The following further describes implementation of the first control bitstream, the second control bitstream, and the random bitstream in this disclosure.

Control Bitstream

It is understood from the foregoing descriptions that the first control bitstream in this disclosure may be used to indicate, to a receive end, that sending of service data is completed and the receive end may turn off partial circuits of a PL_RX. When a transmit end resumes sending service data, the second control bitstream is used to indicate, to the receive end, that the transmit end has started or is to start to send service data and the receive end may turn on the partial circuits of the PL_RX.

In this disclosure, the first control bitstream and the second control bitstream may be uniquely identified by a PHY, and have a specific bit error tolerance capability after being transmitted through a link, to ensure that the bitstream can still be accurately identified when a bit error occurs. In addition, the bitstream includes an indication indicating to turn on or turn off partial circuits at the PHY. A structure and content of the control bitstream are not limited in this disclosure.

It should be noted that the first control bitstream and the second control bitstream in this disclosure may further have an error detection and error correction capability, to ensure that the receive end can correctly identify the first control bitstream and the second control bitstream when a bit error occurs during transmission through the link.

In addition, it should be understood that the first control bitstream and the second control bitstream in this disclosure need to be distinguished from service data.

In some embodiments, a structure of a control bitstream that meets the foregoing requirements may be shown in Table 1.

TABLE 1

| Structure of a control bitstream | | | | | |
| --- | --- | --- | --- | --- | --- |
| marker | marker | . . . | marker | marker | marker |
| Identifier 0 | Identifier 1 | | Identifier N | end | payload |

To be specific, the control bitstream includes a plurality of fields: N+1 repeated marker identifiers, a marker end identifier, and bitstream content (marker payload). N is an integer greater than or equal to 0.

The N+1 repeated marker identifiers are a marker identifier 0, a marker identifier 1, . . . , and a marker identifier N in FIG. 9. The N+1 repeated marker identifiers are used to identify whether current data is a control bitstream.

To ensure that the control bitstream has a specific error tolerance capability, the marker identifier may be constructed by using a Hamming code. At the receive end, a bitstream detection circuit may perform error detection and error correction on a received control bitstream according to a detection and error correction principle of the Hamming code, to ensure that the control bitstream is identified from a plurality of bitstreams.

The marker end identifier is used to indicate that the control bitstream ends. If the receive end receives the marker end identifier, after the receive end then receives the bitstream content, receiving of the control bitstream ends.

The bitstream content is used to indicate that a current control bitstream is used to turn off a PHY circuit or turn on a PHY circuit. The bitstream content may be constructed by using a Hamming code. Different Hamming codes indicate to turn on or turn off partial circuits at the PHY, for example, indicate to turn on or turn off an FEC circuit and a scrambling/descrambling circuit.

For example, when an extended Bose Ray-Chaudhuri Hocquenghem (eBCH) code is used in this disclosure, it is assumed that eBCH-16 is used. The eBCH-16 includes BCH (15, 5) and 1 parity check bit. A payload part of the BCH (15, 5) includes 5 bits, and a code length is 15 bits. A generator polynomial of the eBCH code may be expressed as follows: $g_{BCH(15,5)}(x)=x^{10}+x^8+x^5+x^4+x^2+x+x+1$. An entire eBCH codeword set includes a total of 32 codewords. Table 2 shows a BCH (15, 5) codeword set.

TABLE 2

BCH (15, 5) codeword set

| | Bit 0 | Bit 1 | Bit 2 | Bit 3 | Bit 4 | Bit 5 | Bit 6 | Bit 7 | Bit 8 | Bit 9 | Bit 10 | Bit 11 | Bit 12 | Bit 13 | Bit 14 | Bit 15 |
|---|---|---|---|---|---|---|---|---|---|---|---|---|---|---|---|---|
| CW 0 | 0 | 0 | 0 | 0 | 0 | 0 | 0 | 0 | 0 | 0 | 0 | 0 | 0 | 0 | 0 | 0 |
| CW 1 | 0 | 0 | 0 | 0 | 1 | 0 | 1 | 0 | 0 | 1 | 1 | 0 | 1 | 1 | 1 | 1 |
| CW 2 | 0 | 0 | 0 | 1 | 0 | 1 | 0 | 0 | 1 | 1 | 0 | 1 | 1 | 1 | 0 | 1 |
| CW 3 | 0 | 0 | 0 | 1 | 1 | 1 | 1 | 0 | 1 | 0 | 1 | 1 | 0 | 0 | 1 | 0 |
| CW 4 | 0 | 0 | 1 | 0 | 0 | 0 | 1 | 1 | 1 | 1 | 0 | 1 | 0 | 1 | 1 | 0 |
| CW 5 | 0 | 0 | 1 | 0 | 1 | 0 | 0 | 1 | 1 | 0 | 1 | 1 | 1 | 0 | 0 | 1 |
| CW 6 | 0 | 0 | 1 | 1 | 0 | 1 | 1 | 1 | 0 | 0 | 0 | 0 | 1 | 0 | 1 | 1 |
| CW 7 | 0 | 0 | 1 | 1 | 1 | 1 | 0 | 1 | 0 | 1 | 1 | 0 | 0 | 1 | 0 | 0 |
| CW 8 | 0 | 1 | 0 | 0 | 0 | 1 | 1 | 1 | 0 | 0 | 1 | 0 | 1 | 1 | 0 | 0 |
| CW 9 | 0 | 1 | 0 | 0 | 1 | 1 | 0 | 1 | 1 | 1 | 0 | 0 | 0 | 0 | 1 | 1 |
| CW 10 | 0 | 1 | 0 | 1 | 0 | 0 | 1 | 1 | 0 | 1 | 1 | 1 | 0 | 0 | 0 | 1 |
| CW 11 | 0 | 1 | 0 | 1 | 1 | 0 | 0 | 1 | 0 | 0 | 0 | 1 | 1 | 1 | 1 | 0 |
| CW 12 | 0 | 1 | 1 | 0 | 0 | 1 | 0 | 0 | 0 | 1 | 1 | 1 | 1 | 0 | 1 | 0 |
| CW 13 | 0 | 1 | 1 | 0 | 1 | 1 | 1 | 0 | 0 | 0 | 0 | 1 | 0 | 1 | 0 | 1 |
| CW 14 | 0 | 1 | 1 | 1 | 0 | 0 | 0 | 0 | 1 | 0 | 1 | 0 | 0 | 1 | 1 | 1 |
| CW 15 | 0 | 1 | 1 | 1 | 1 | 0 | 1 | 0 | 1 | 1 | 0 | 0 | 1 | 0 | 0 | 0 |
| CW 16 | 1 | 0 | 0 | 0 | 0 | 1 | 0 | 1 | 0 | 0 | 1 | 1 | 0 | 1 | 1 | 1 |
| CW 17 | 1 | 0 | 0 | 0 | 1 | 1 | 1 | 1 | 0 | 1 | 0 | 1 | 1 | 0 | 0 | 0 |
| CW 18 | 1 | 0 | 0 | 1 | 0 | 0 | 0 | 1 | 1 | 1 | 1 | 0 | 1 | 0 | 1 | 0 |
| CW 19 | 1 | 0 | 0 | 1 | 1 | 0 | 1 | 1 | 1 | 0 | 0 | 0 | 0 | 1 | 0 | 1 |
| CW 20 | 1 | 0 | 1 | 0 | 0 | 1 | 1 | 0 | 1 | 1 | 1 | 0 | 0 | 0 | 0 | 1 |
| CW 21 | 1 | 0 | 1 | 0 | 1 | 1 | 0 | 0 | 1 | 0 | 0 | 0 | 1 | 1 | 1 | 0 |
| CW 22 | 1 | 0 | 1 | 1 | 0 | 0 | 1 | 0 | 0 | 0 | 1 | 1 | 1 | 1 | 0 | 0 |
| CW 23 | 1 | 0 | 1 | 1 | 1 | 0 | 0 | 0 | 0 | 1 | 0 | 1 | 0 | 0 | 1 | 1 |
| CW 24 | 1 | 1 | 0 | 0 | 0 | 0 | 1 | 0 | 1 | 0 | 0 | 1 | 1 | 0 | 1 | 1 |
| CW 25 | 1 | 1 | 0 | 0 | 1 | 0 | 0 | 0 | 1 | 1 | 1 | 1 | 0 | 1 | 0 | 0 |
| CW 26 | 1 | 1 | 0 | 1 | 0 | 1 | 1 | 0 | 0 | 1 | 0 | 0 | 0 | 1 | 1 | 0 |
| CW 27 | 1 | 1 | 0 | 1 | 1 | 1 | 0 | 0 | 0 | 0 | 1 | 0 | 1 | 0 | 0 | 1 |
| CW 28 | 1 | 1 | 1 | 0 | 0 | 0 | 0 | 1 | 0 | 1 | 0 | 0 | 1 | 1 | 0 | 1 |
| CW 29 | 1 | 1 | 1 | 0 | 1 | 0 | 1 | 1 | 0 | 0 | 1 | 0 | 0 | 0 | 1 | 0 |
| CW 30 | 1 | 1 | 1 | 1 | 0 | 1 | 0 | 1 | 1 | 0 | 0 | 1 | 0 | 0 | 0 | 0 |
| CW 31 | 1 | 1 | 1 | 1 | 1 | 1 | 1 | 1 | 1 | 1 | 1 | 1 | 1 | 1 | 1 | 1 |

During transmission of the first control bitstream or the second control bitstream, a balance between 0s and 1s (a quantity of 0s and a quantity of 1s in data sent within unit time are balanced) further needs to be considered. After an encoding result is obtained by using the BCH (15, 5) codeword set, a codeword with balanced 0s and 1s may be determined based on a codeword set that meets direct-current balancing in Table 3.

TABLE 3

Codeword set meeting direct-current balancing

| Num | eBCH codeword (Code) | Original BCH code (76543210_76543210) | NRZ (43275160_75432160) (76543210_76543210) | PAM4 symbol (3210 210) |
|---|---|---|---|---|
| 0 | 8 | 01000111_10101100 | 00100111_11011000 | 0312_2130 |
| 1 | 28 | 11100001_01001101 | 00011011_00011011 | 0132_0132 |
| 2 | 3 | 00011110_10110010 | 11100100_11100100 | 2310_2310 |
| 3 | 23 | 10111000_01010011 | 11011000_00100111 | 2130_0312 |
| 4 | 9 | 01001101_11000011 | 01100011_10000111 | 1302_3012 |
| 5 | 21 | 10101100_10001110 | 01111000_10011100 | 1230_3120 |
| 6 | 10 | 01010011_01110001 | 10000111_01100011 | 3012_1302 |
| 7 | 22 | 10110010_00111100 | 10011100_01111000 | 3120_1230 |

When a control bitstream generation circuit generates a code similar to the original BCH code, to balance a quantity of 0s and a quantity of 1s in encoded data, 0 and 1 balancing adjustment may be performed by using a non-return to zero (NRZ) or level pulse-amplitude modulation (PAM) 4 code pattern (PAM4). Each symbol in the PAM4 code pattern represents two bits. For example, when the NRZ is used, if a pre-modulation codeword is 01000111_10101100, a modulated codeword obtained through adjustment based on a location correspondence between (43275160_75432160) and (76543210_76543210) in the NRZ is 00100111_11011000.

The following provides an example of a control bitstream. Refer to Table 4.

TABLE 4

| Example of a control bitstream | |
| --- | --- |
| Symbol number | Description (Description) |
| 0 to (4 × M − 1) [A value of M may range from 1 to 5.] | Marker identify: CW 21, CW 28 |
| 4 × M to (4 × M + 3) | Marker END: CW 22, CW 3 |
| 4 × N + 4 to (4 × N + 11) | Reserved |
| 4 × N + 12 to (4 × N + 19) | [63:0] Marker payload CW 3, CW 8 |
| 4 × N + 20 to (4 × N + 27) | [63:0] Marker payload CW 23, CW 3: Closed FEC, SCRAMBLER CW 28, CW 8: Open FEC, SCRAMBLER |

With reference to Table 4, the symbol number indicates a quantity of symbols occupied by each type of description information. In this example, the following is described: codewords used for the marker identify, namely, a marker identifier, are the CW 21 and the CW 28 in Table 2; codewords used for the marker END, namely, a marker end identifier, are the CW 22 and the CW 3; and codewords used for the marker payload, namely, marker content, are the CW 3 and the CW 8. When content of the control bitstream indicates to turn off (closed) a PHY circuit, codewords used for the marker content are the CW 23 and the CW 3. When content of the control bitstream indicates to turn on (open) a PHY circuit, codewords used for the marker content are the CW 28 and the CW 8. After a codeword used for the control bitstream is determined, locations of 0s and 1s in the codeword may be adjusted based on the modulated codeword set, shown in Table 3, in which 0s and Is are balanced.

Random Bitstream

It can be learned from the foregoing descriptions that the random bitstream is sent after the transmit end sends the first control bitstream, to ensure that a PL_TX continues to input a bitstream to a SerDes in a link after stopping sending service data. This can avoid occurrence of an exception when a SerDes at a receive end receives data in a case in which the SerDes sends no bitstream. In this way, CDR in the SerDes remains in a locked state.

In this disclosure, randomness needs to be ensured for generation of the random bitstream, and a quantity of 0s and a quantity of 1s need to be balanced.

In some embodiments, the random bitstream generation circuit may generate a pseudo random bitstream by using a polynomial: $G(X)=X^{23}+X^{21}+X^{16}+X^{8}+X^{5}+X^{2}+1$. A segment of data in the pseudo random bitstream is taken as the random bitstream to be sent in this disclosure.

Certainly, the control bitstream and the random bitstream in this disclosure may alternatively be implemented in another manner. This is not limited in this disclosure.

It can be understood that, to implement the foregoing functions, the high-speed serial interface includes corresponding hardware and/or software modules for performing the functions. With reference to algorithms and steps in examples described in embodiments disclosed in this specification, this disclosure can be implemented in a form of hardware or a combination of hardware and computer software. Whether a function is performed by hardware or hardware driven by computer software depends on particular applications and design constraints of technical solutions. A person skilled in the art may use different methods to implement the described functions for each specific application with reference to embodiments. However, it should not be considered that the implementation goes beyond the scope of this disclosure.

In embodiments, the high-speed serial interface may be divided into functional modules based on the foregoing method examples. For example, each functional module may be obtained through division for a corresponding function, or two or more functions may be integrated into one processing module. The integrated module may be implemented in a form of hardware. It should be noted that, in embodiments, division into the modules is an example, and is merely logical function division. During actual implementation, another division manner may be used.

Figure 13:
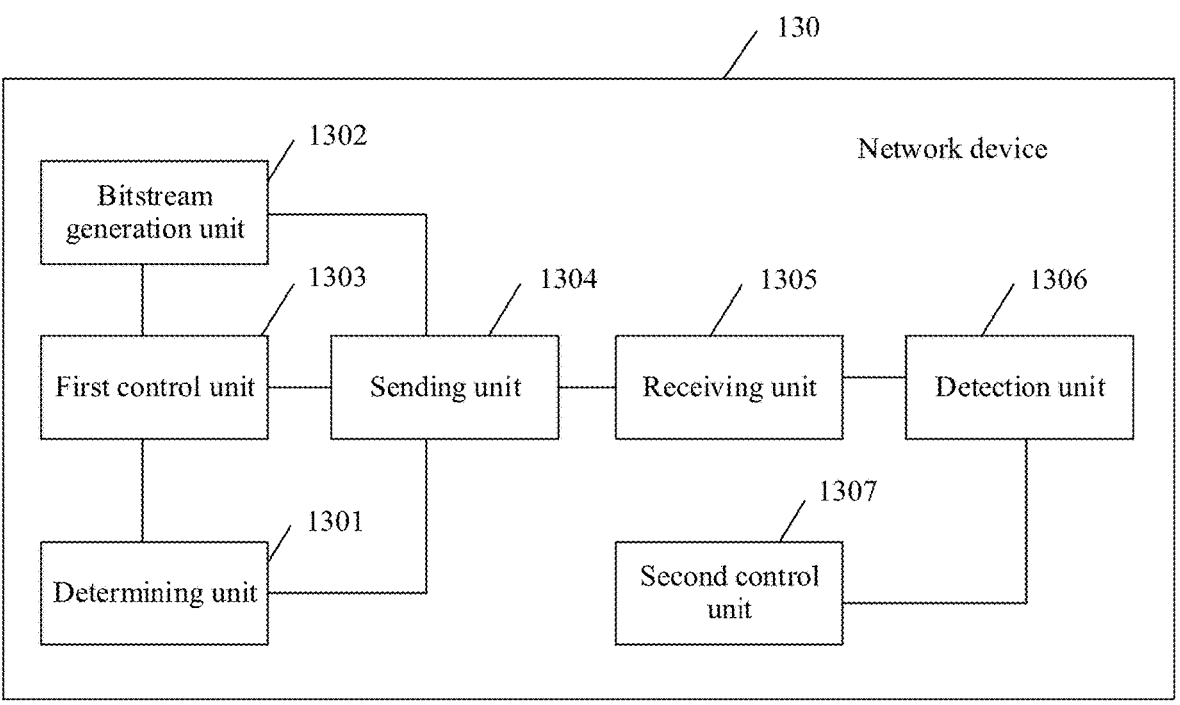
FIG. 13 is a schematic of a structure of a network device according to an embodiment of this disclosure.

When each functional module is obtained through division for a corresponding function, FIG. 13 is a schematic of a possible composition of a network device 130 in the foregoing embodiments. The network device may include a serial interface circuit. As shown in FIG. 13, when the network device includes a transmit end for sending a bitstream and a receive end, for example, the transmit end is the SoC in the foregoing descriptions, and the receive end is the network interface card in the foregoing descriptions. The network device 130 may include a determining unit 1301, a bitstream generation unit 1302, a first control unit 1303, a sending unit 1304, a receiving unit 1305, a detection unit 1306, and a second control unit 1307.

The determining unit 1301 may be configured to support the network device 130 in performing the foregoing process of determining that the high-speed serial interface stops or resumes sending service data, and/or another process of the technology described in this specification. The determining unit 1301 is equivalent to a function of the monitor in this disclosure.

The bitstream generation unit 1302 may be configured to support the network device 130 in performing the foregoing processes of generating the first control bitstream, the second control bitstream, the random bitstream, and the like, and/or another process of the technology described in this specification. The bitstream generation unit 1302 equivalently includes functions of the control bitstream generation circuit and the random bitstream generation circuit in this disclosure.

The first control unit 1303 may be configured to support the network device 130 in performing the foregoing processes of generating and sending the clock signal at the transmit end and the like, and/or another process of the technology described in this specification. The first control unit 1303 equivalently includes a function of the CLK_GAT at the transmit end in this disclosure.

The sending unit 1304 may be configured to support the network device 130 in performing the foregoing processes of sending the first control bitstream, the second control bitstream, the random bitstream, the service data, and the like, and/or another process of the technology described in this specification. The sending unit 1304 includes a function of the TX circuit of the SerDes in this disclosure.

The receiving unit 1305 may be configured to support the network device 130 in performing the foregoing processes of receiving the first control bitstream, the second control bitstream, the random bitstream, the service data, and the like, and/or another process of the technology described in this specification. The receiving unit 1305 includes a function of the RX circuit of the SerDes in this disclosure.

The detection unit 1306 may be configured to support the network device 130 in performing the foregoing processes of detecting the first control bitstream, the second control bitstream, the random bitstream, and the like.

The second control unit 1307 may be configured to support the network device 130 in performing the foregoing processes of generating and sending the clock signal at the receive end, and the like, and/or another process of the technology described in this specification. The second control unit 1307 equivalently includes a function of the CLK-_GAT at the receive end in this disclosure.

It should be noted that all related content of the steps in the foregoing method embodiments may be cited in function descriptions of corresponding functional modules. Details are not described herein again.

The network device 130 provided in this embodiment is configured to perform the foregoing data transmission method, and therefore can achieve the same effect as the foregoing implementation methods.

When an integrated unit is used, the network device 130 may include a processing module, a storage module, and a communication module. The processing module may be configured to control and manage an action of the network device 130. For example, the processing module may be configured to support the network device 130 in performing the steps performed by the determining unit 1301, the bitstream generation unit 1302, the first control unit 1303, the detection unit 1306, and the second control unit 1307. The storage module may be configured to support the network device 130 in storing program code, data, and the like. The communication module may be configured to support communication between a transmit end and a receive end in the network device 130. In this disclosure, the communication module may be configured to support the network device 130 in performing the steps performed by the sending unit 1304 and the receiving unit 1305.

The processing module may be a processor or a controller. The processing module may implement or execute various example logical blocks, modules, and circuits described with reference to content disclosed in this disclosure. The processor may alternatively be a combination for implementing a computing function, for example, a combination including one or more microprocessors or a combination of a digital signal processor (DSP) and a microprocessor. The storage module may be a memory. The communication module may be a circuit, for example, a SerDes.

An embodiment of this disclosure further provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the data transmission method in the foregoing embodiments.

An embodiment of this disclosure further provides a computer storage medium. The computer storage medium stores computer instructions. When the computer instructions run on an electronic device, the electronic device is enabled to perform the foregoing related method steps, to implement the data transmission method in the foregoing embodiments.

An embodiment of this disclosure further provides a computer program product. When the computer program product is run on a computer, the computer is enabled to perform the foregoing related steps, to implement the data transmission method performed by the electronic device including the high-speed serial interface in the foregoing embodiments.

In addition, an embodiment of this disclosure further provides an apparatus. The apparatus may be a chip, a component, or a module. The apparatus may include a processor and a memory that are connected to each other.

The memory is configured to store computer-executable instructions. When the apparatus runs, the processor may execute the computer-executable instructions stored in the memory, so that the chip performs the data transmission method performed by the electronic device including the high-speed serial interface in the foregoing method embodiments.

The electronic device, the computer storage medium, the computer program product, or the chip provided in embodiments is configured to perform the corresponding method provided above. Therefore, for beneficial effect that can be achieved by the electronic device, the computer storage medium, the computer program product, or the chip, refer to the beneficial effect of the corresponding method provided above. Details are not described herein again.

Based on the descriptions of the foregoing implementations, a person skilled in the art may understand that, for a purpose of convenient and brief description, division into the foregoing functional modules is merely used as an example for illustration. In actual application, the foregoing functions may be allocated to different functional modules and implemented according to a requirement. In other words, an inner structure of the apparatus is divided into different functional modules to implement all or some of the functions described above.

In several embodiments provided in this disclosure, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may be one or more physical units, that is, may be located in one place, or may be distributed in a plurality of different places. Some or all of the units may be selected according to actual requirements to achieve objectives of solutions of embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, technical solutions in embodiments of this disclosure essentially, or the part contributing to another technology, or all or some of the technical solutions may be implemented in a form of a software product. The software product is stored in a storage medium and includes several instructions for instructing a device (which may be a single-chip microcomputer, a chip, or the like) or a processor to perform all or some of steps of methods in embodiments of this disclosure. The storage medium includes any medium that can store program code, for example, a Universal Serial Bus (USB) flash drive, a removable hard disk drive, a read-only memory (ROM), a random-access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A high-speed serial interface configured to be implemented at a transmit end, wherein the high-speed serial interface comprises:

a first physical layer (PHY) circuit comprising first partial modules, wherein the first partial modules do not comprise all modules of the first PHY circuit;

a clock grating circuit coupled to the first PHY circuit and configured to send a clock signal to the first partial modules;

a monitor coupled to the clock grating circuit and configured to instruct the clock gating circuit to stop sending the clock signal to the first partial modules when the transmit end is not sending service data;

a control bitstream generation circuit configured to send a first control bitstream when the clock gating circuit stops sending the clock signal, wherein the first control bitstream indicates that the transmit end has turned off the first partial modules, indicates that the transmit end is to turn off the first partial modules, or instructs a receive end to turn off second partial modules in a second PHY circuit at the receive end, and wherein the second partial modules do not comprise all modules of the second PHY circuit;

a random bitstream generation circuit is configured to send a random bitstream after the control bitstream generation circuit sends the first control bitstream; and a serializer/deserializer (SerDes) coupled to first PHY circuit, the control bitstream generation circuit, and the random bitstream generation circuit and configured to:

receive, from the control bitstream generation circuit, the first control bitstream; and receive, from the random bitstream generation circuit, the random bitstream.

2. The high-speed serial interface of claim 1, wherein the first partial modules comprise at least one of a forward error correction (FEC) encoding circuit or a scrambling circuit.

3. The high-speed serial interface of claim 1, further comprising a data link layer (DL) coupled to the first PHY circuit, wherein the monitor is further configured to:

monitor whether the DL is sending the service data to the second PHY circuit; and determine that the transmit end is not sending the service data when the DL is not sending the service data to the second PHY circuit.

4. The high-speed serial interface of claim 1, wherein the monitor is further configured to:

send a first signal to the control bitstream generation circuit when the clock gating circuit stops sending the clock signal to the first partial modules, wherein the first signal instructs the control bitstream generation circuit to send the first control bitstream; and send a second signal to the random bitstream generation circuit when the control bitstream generation circuit completes sending the first control bitstream, wherein the second signal instructs the random bitstream generation circuit to send the random bitstream.

5. The high-speed serial interface of claim 1, wherein the monitor is further configured to instruct the clock gating circuit to send the clock signal to the first partial modules when the transmit end resumes sending the service data, wherein the clock gating circuit is further configured to send the clock signal to the first partial modules, wherein the random bitstream generation circuit is further configured to stop sending the random bitstream when the clock gating circuit starts sending the clock signal, wherein the control bitstream generation circuit is further configured to send, through the SerDes, a second control bitstream when the transmit end resumes sending the service data, wherein the second control bitstream indicates that the transmit end has turned on the first partial modules, indicates that the transmit end is to turn on the first partial modules, or instructs the receive end to turn on the second partial modules, and wherein the first PHY circuit is configured to start sending, through the SerDes, the service data.

6. The high-speed serial interface of claim 5, wherein the first control bitstream comprises a first plurality of repeated bitstream identifiers, a first marker end identifier, and first bitstream content, wherein the first bitstream content indicates that the transmit end has turned off the first partial modules, indicates that the transmit end is to turn off the first partial modules, or instructs the receive end to turn off the second partial modules, wherein the first marker end identifier indicates a first position of a first end bit of the first control bitstream, wherein the second control bitstream comprises a second plurality of repeated bitstream identifiers, a second marker end identifier, and second bitstream content, wherein the second bitstream content indicates that the transmit end has turned on the first partial modules, indicates that the transmit end is to turn on the first partial modules, or instructs the receive end to turn on the second partial modules, wherein the second marker end identifier indicates a second position of a second end bit of the second control bitstream, wherein the random bitstream enables a clock and data recovery (CDR) circuit in the SerDes to be in a locked state, and wherein the random bitstream comprises 0s and 1s that are balanced in quantities.

7. A high-speed serial interface configured to be implemented at a receive end, wherein the high-speed serial interface comprises:

a serial/deserializer (SerDes);

a first physical layer (PHY) circuit comprising first partial modules, wherein the first partial modules do not comprise all modules of the first PHY circuit;

a clock gating circuit coupled to the first PHY circuit and configured to send a clock signal to the first PHY circuit; and a bitstream detection circuit coupled to the SerDes, the first PHY circuit, and the clock gating circuit and configured to:

receive, through the SerDes, a first control bitstream, wherein the first control bitstream indicates that a transmit end has turned off second partial modules in a second PHY circuit at the transmit end, indicates that the transmit end is to turn off the second partial modules, or instructs the receive end to turn off the first partial modules, and wherein the second partial modules do not comprise all modules of the second PHY circuit;

instruct the clock gating circuit to stop sending the clock signal to the first partial modules;

stop sending the clock signal to the first partial modules; and receive, through the SerDes, a random bitstream after receiving the first control bitstream.

8. The high-speed serial interface of claim 7, wherein the first partial modules comprise at least one of a forward error correction (FEC) decoding circuit or a descrambling circuit.

9. The high-speed serial interface of claim 7, further comprising a data link layer (DL), wherein the clock gating circuit is further configured to stop sending the clock signal to the first partial modules when an interval from the last time at which the first PHY circuit sends service data to the DL exceeds a preset time period.

10. The high-speed serial interface of claim 7, wherein the bitstream detection circuit is further configured to:

control the SerDes to receive a second control bitstream;

instruct the clock gating circuit to send the clock signal to the first partial modules when the second control bitstream indicates that the transmit end has turned on the second partial modules, indicates that the transmit end is to turn on the second partial modules, or instructs the receive end to turn on the first partial modules;

receive, from the SerDes, service data; and send, to the first PHY circuit, the service data.

11. The high-speed serial interface of claim 10, wherein the first control bitstream comprises a first plurality of repeated marker identifiers, a first marker end identifier, and first bitstream content, wherein the first bitstream content indicates that the transmit end has turned off the second partial modules, indicates that the transmit end is to turn off the second partial modules, or instructs the receive end to turn off the first partial modules, wherein the first marker end identifier indicates a first position of a first end bit of the first control bitstream, wherein the second control bitstream comprises a second plurality of repeated marker identifiers, a second marker end identifier, and second bitstream content, wherein the second bitstream content indicates that the transmit end has turned on the second partial modules, indicates that the transmit end is to turn on the second partial modules, or instructs the receive end to turn on the first partial modules, wherein the second marker end identifier indicates a second position of a second end bit of the second control bitstream, wherein the random bitstream enables a clock and data recovery (CDR) circuit in the SerDes to remain in a locked state, wherein the random bitstream comprises 0s and 1s that are balanced in quantities, and wherein the bitstream detection circuit is further configured to discard the random bitstream when the random bitstream is identified.

12. A method, applied to a high-speed serial interface at a transmit end, comprising:

sending a first control bitstream when the transmit end is not sending service data, wherein the first control bitstream indicates that the transmit end has turned off first partial modules in a first physical layer (PHY) circuit at the transmit end, indicates that the transmit end is to turn off the first partial modules, or instructs a receive end to turn off second partial modules in a second PHY circuit at the receive end, wherein the first partial modules do not comprise all modules of the first PHY circuit, and wherein the second partial modules do not comprise all modules of the second PHY circuit;

turning off the first partial modules; and sending a random bitstream after the second partial modules in the second PHY circuit at the receive end are turned off.

13. The method of claim 12, wherein the first partial modules comprise at least one of a forward error correction (FEC) encoding circuit or a scrambling circuit.

14. The method of claim 12, wherein the high-speed serial interface further comprises a data link layer (DL), and wherein the method further comprises determining that the transmit end is not sending the service data when the DL is not sending the service data to the first PHY circuit.

15. The method of claim 12, wherein the high-speed serial interface further comprises a serializer/deserializer (SerDes), and when the transmit end resumes sending the service data, and wherein the method further comprises:

sending a second control bitstream, wherein the second control bitstream indicates that the transmit end has turned on the first partial modules, indicates that the transmit end is to turn on the first partial modules, or instructs the receive end to turn on the second partial modules;

turning on the first partial modules; and controlling the first PHY circuit to send the service data to the SerDes.

16. The method of claim 15, wherein the first control bitstream comprises a first plurality of repeated bitstream identifiers, a first marker end identifier, and first bitstream content, wherein the first bitstream content indicates that the transmit end has turned off the first partial modules, indicates that the transmit end is to turn off the first partial modules, or instructs the receive end to turn off the second partial modules, wherein the first marker end identifier indicates a first position of a first end bit of the first control bitstream, wherein the second control bitstream comprises a second plurality of repeated bitstream identifiers, a second marker end identifier, and second bitstream content, wherein the second bitstream content indicates that the transmit end has turned on the first partial modules, indicates that the transmit end is to turn on the first partial modules, or instructs the receive end to turn on the second partial modules, wherein the second marker end identifier indicates a second position of a second end bit of the second control bitstream, wherein the random bitstream enables a clock and data recovery (CDR) circuit in the SerDes to be in a locked state, and wherein the random bitstream comprises 0s and 1s that are balanced in quantities.

17. A method, applied to a high-speed serial interface at a receive end, the method comprising:

receiving a first control bitstream, wherein the first control bitstream indicates that a transmit end has turned off first partial modules in a first physical layer (PHY) circuit at the transmit end, indicates that the transmit end is to turn off the first partial modules, or instructs the receive end to turn off second partial modules in a second PHY circuit at the receive end, wherein the first partial modules do not comprise all modules of the first PHY circuit, and wherein the second partial modules do not comprise all modules of the second PHY circuit;

turning off the second partial modules; and receiving a random bitstream after the second partial modules in the second PHY circuit at the receive end are turned off.

18. The method of claim 17, wherein the second partial modules comprise at least one of a forward error correction (FEC) decoding circuit or a descrambling circuit.

19. The method of claim 17, wherein the high-speed serial interface further comprises a serializer/deserializer (SerDes), and wherein the method further comprises:

controlling the SerDes to receive a second control bitstream, wherein the second control bitstream indicates that the transmit end has turned on the first partial modules, indicates that the transmit end is to turn on the first partial modules, or instructs the receive end to turn on the second partial modules;

turning on the second partial modules; and controlling the second PHY circuit to receive, through the SerDes, service data.

20. The method of claim 19, wherein the first control bitstream comprises a first plurality of repeated marker identifiers, a first marker end identifier, and first bitstream content, wherein the first bitstream content indicates that the transmit end has turned off the first partial modules, indicates that the transmit end is to turn off the first partial modules, or instructs the receive end to turn off the second partial modules, wherein the first marker end identifier indicates a first position of a first end bit of the first control bitstream, wherein the second control bitstream comprises a second plurality of repeated marker identifiers, a second marker end identifier, and second bitstream content, wherein the second bitstream content indicates that the transmit end has turned on the first partial modules, indicates that the transmit end is to turn on the first partial modules, or instructs the receive end to turn on the second partial modules, wherein the second marker end identifier indicates a second position of a second end bit of the second control bitstream, wherein the random bitstream enables a clock and data recovery (CDR) circuit in the SerDes to be in a locked state, wherein the random bitstream comprises 0s and 1s that are balanced in quantities, and wherein the method further comprises discarding the random bitstream when the random bitstream is identified.

21. A computer program product comprising instructions stored on a non-transitory computer-readable storage medium that, when executed by one or more processors, cause an electronic device configured to be implemented at a transmit end to:

send a first control bitstream when the transmit end is not sending service data, wherein the first control bitstream indicates that the transmit end has turned off first partial modules in a first physical layer (PHY) circuit at the transmit end, indicates that the transmit end is to turn off the first partial modules, or instructs a receive end to turn off second partial modules in a second PHY circuit at the receive end, wherein the first partial modules do not comprise all modules of the first PHY circuit, and wherein the second partial modules do not comprise all modules of the second PHY circuit;

turn off the first partial modules; and send a random bitstream after the electronic device sends the first control bitstream.

22. A computer program product comprising instructions stored on a non-transitory computer-readable storage medium that, when executed by one or more processors, cause an electronic device configured to be implemented at a receive end to:

receive a first control bitstream, wherein the first control bitstream indicates that a transmit end has turned off first partial modules in a first physical layer (PHY) circuit at the transmit end, indicates that the transmit end is to turn off the first partial modules, or instructs the receive end to turn off second partial modules in a second PHY circuit at the receive end, wherein the first partial modules do not comprise all modules of the first PHY circuit, and wherein the second partial modules do not comprise all modules of the second PHY circuit;

turn off the second partial modules; and receive a random bitstream after the second partial modules in the second PHY circuit at the receive end are turned off.

* * * * *